Jan. 5, 1965   S. G. REQUE   3,164,807
FUNCTION GENERATOR
Filed Dec. 31, 1959   9 Sheets-Sheet 1

INVENTOR
STYRK G. REQUE
BY A. M. Fernandez
ATTORNEY

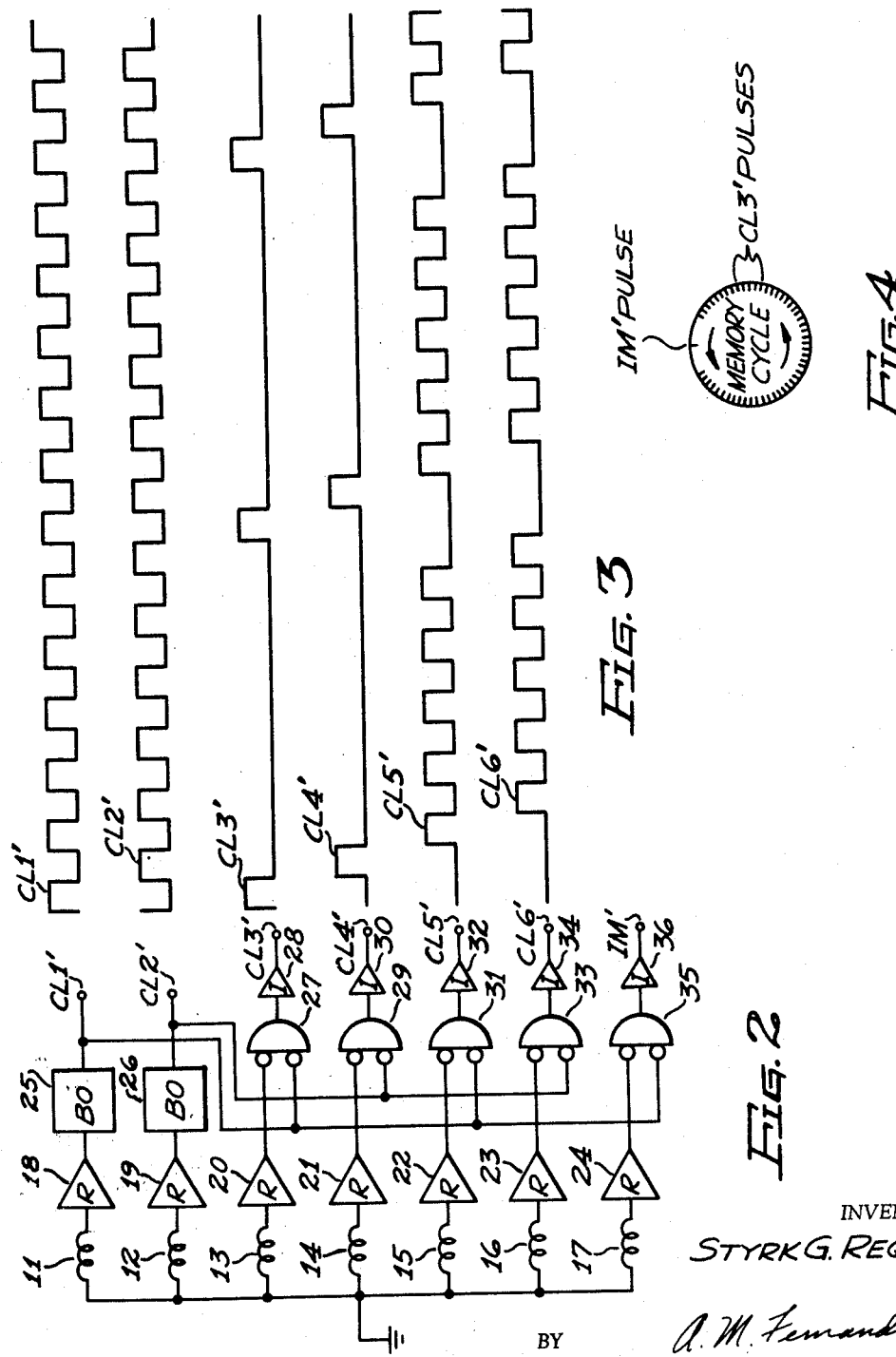

INVENTOR
STYRK G. REQUE
BY A. M. Fernandez
ATTORNEY

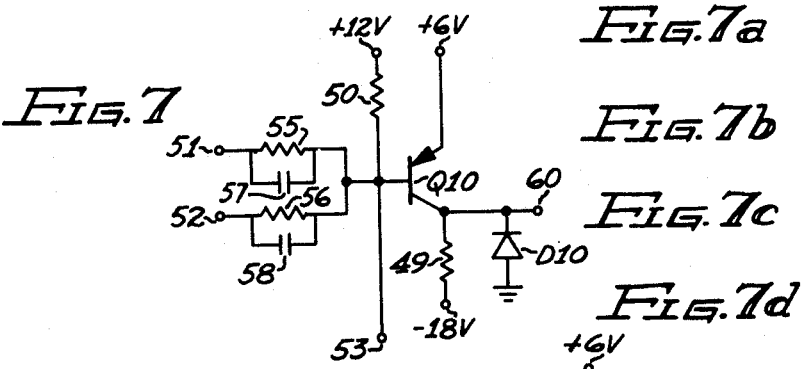
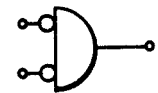
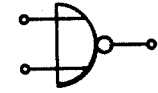
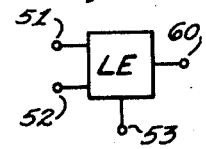
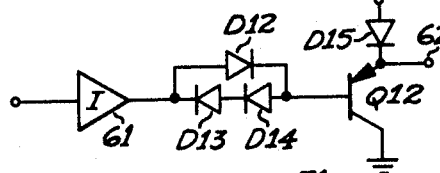
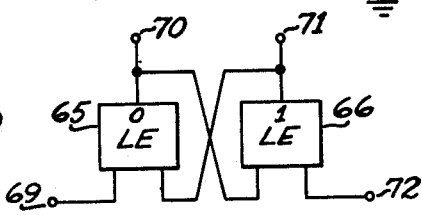
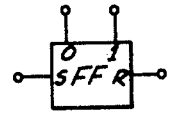
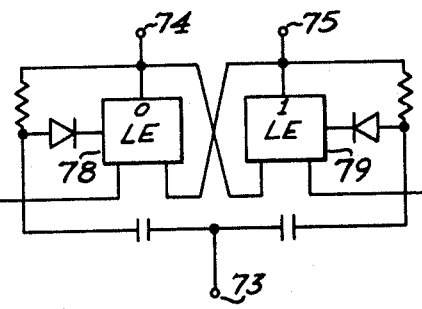
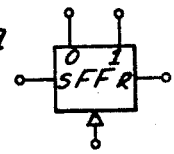
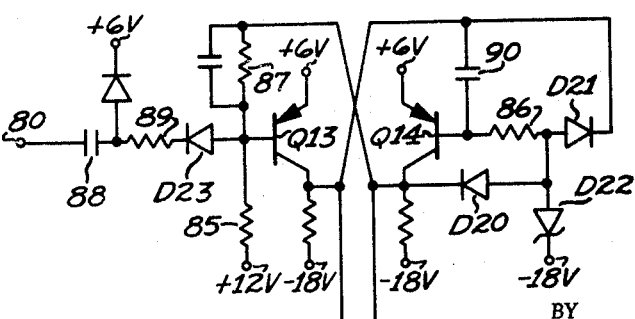
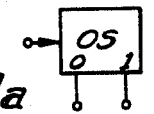
INVENTOR
STYRK G. REQUE
BY
ATTORNEY INVENTOR.
STYRK G. REQUE
BY
*A. M. Fernandez*
ATTORNEY Jan. 5, 1965 S. G. REQUE 3,164,807
FUNCTION GENERATOR
Filed Dec. 31, 1959 9 Sheets-Sheet 6
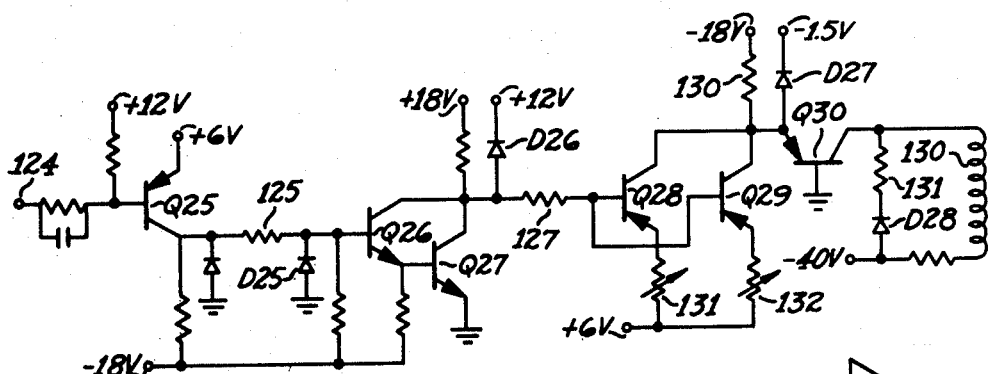
Fig.14
Fig.14a
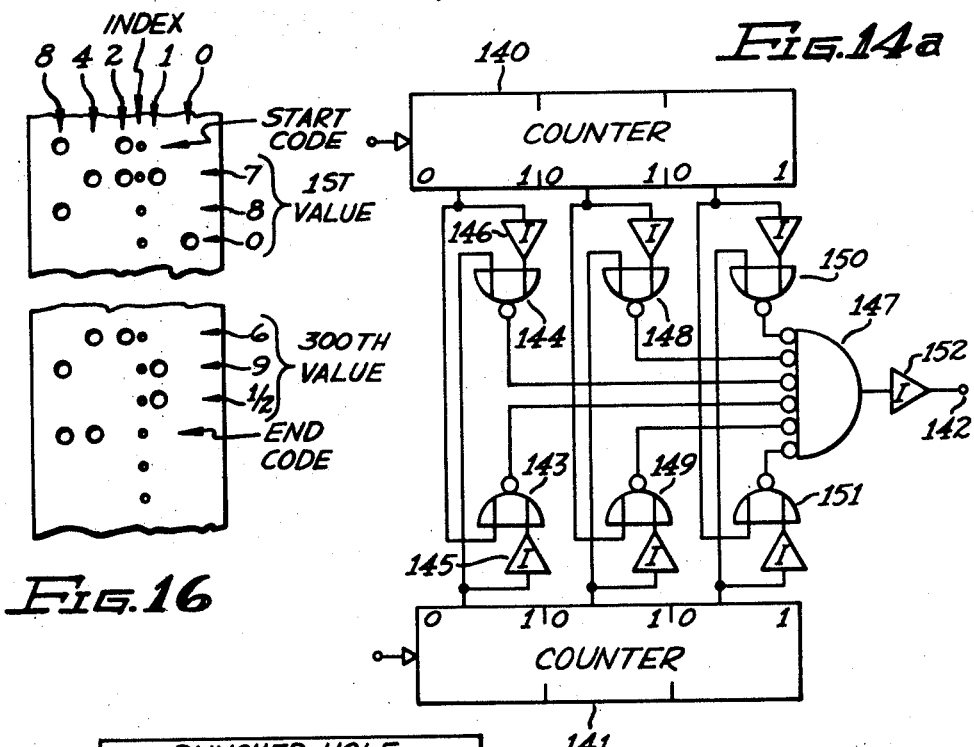
Fig.16
Fig.15
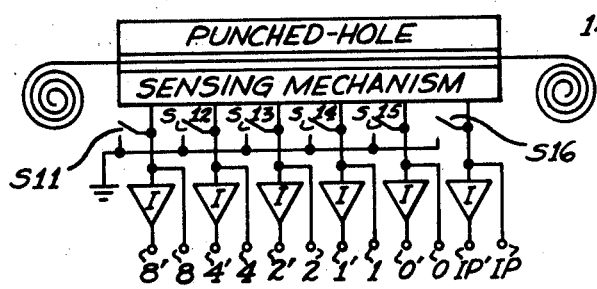
Fig.17
INVENTOR.
STYRK G. REQUE
BY  A. M. Fernandez
ATTORNEY

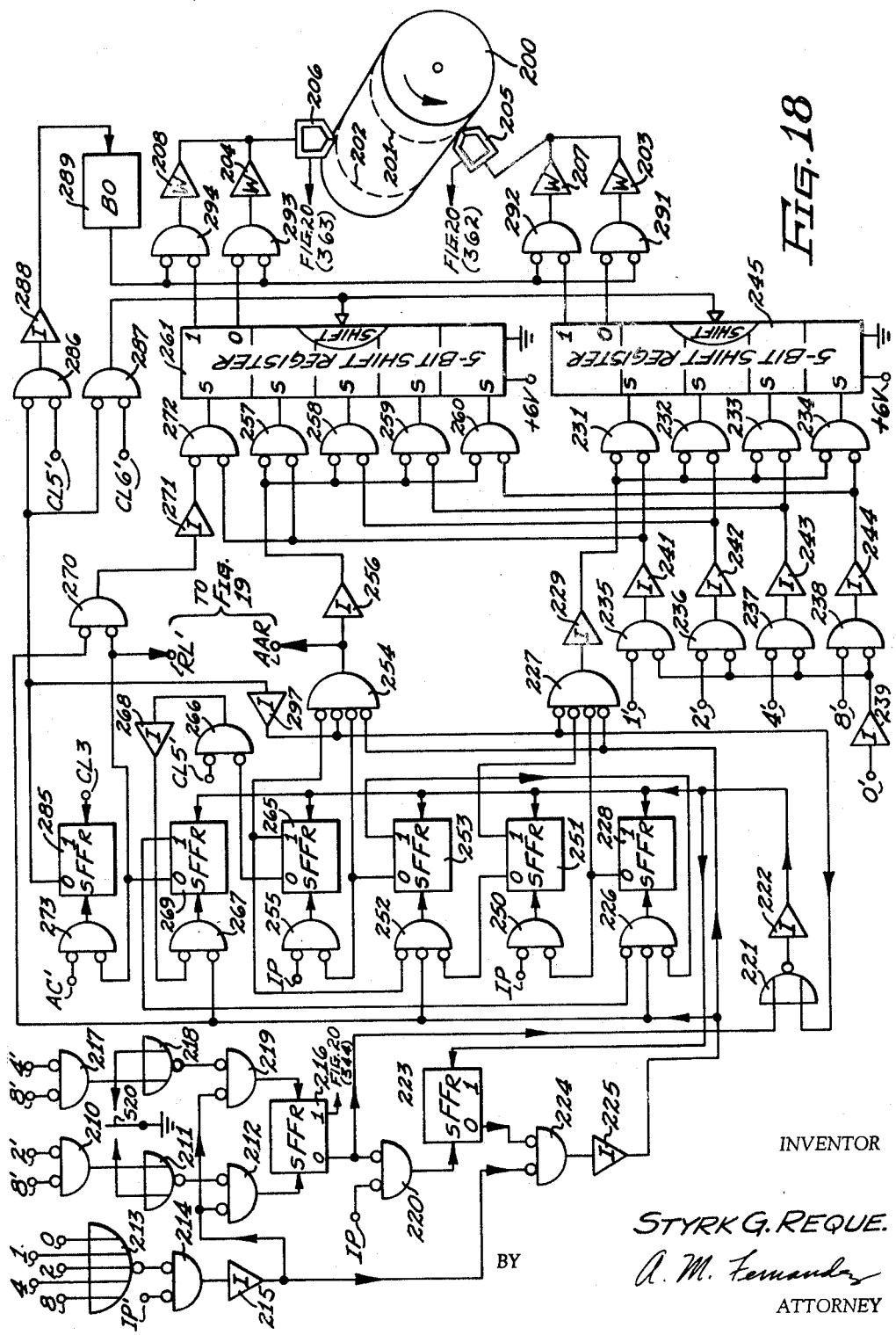

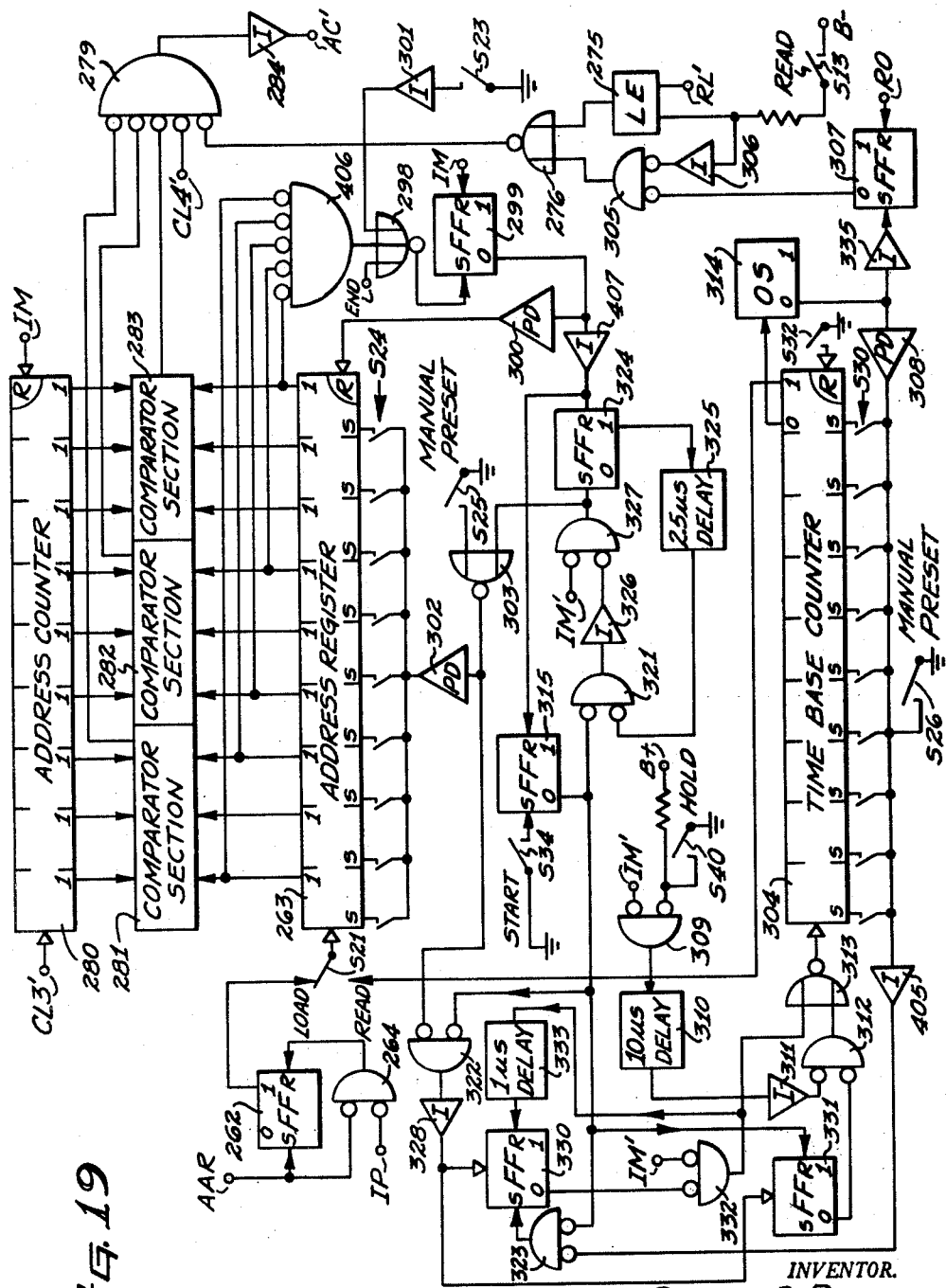

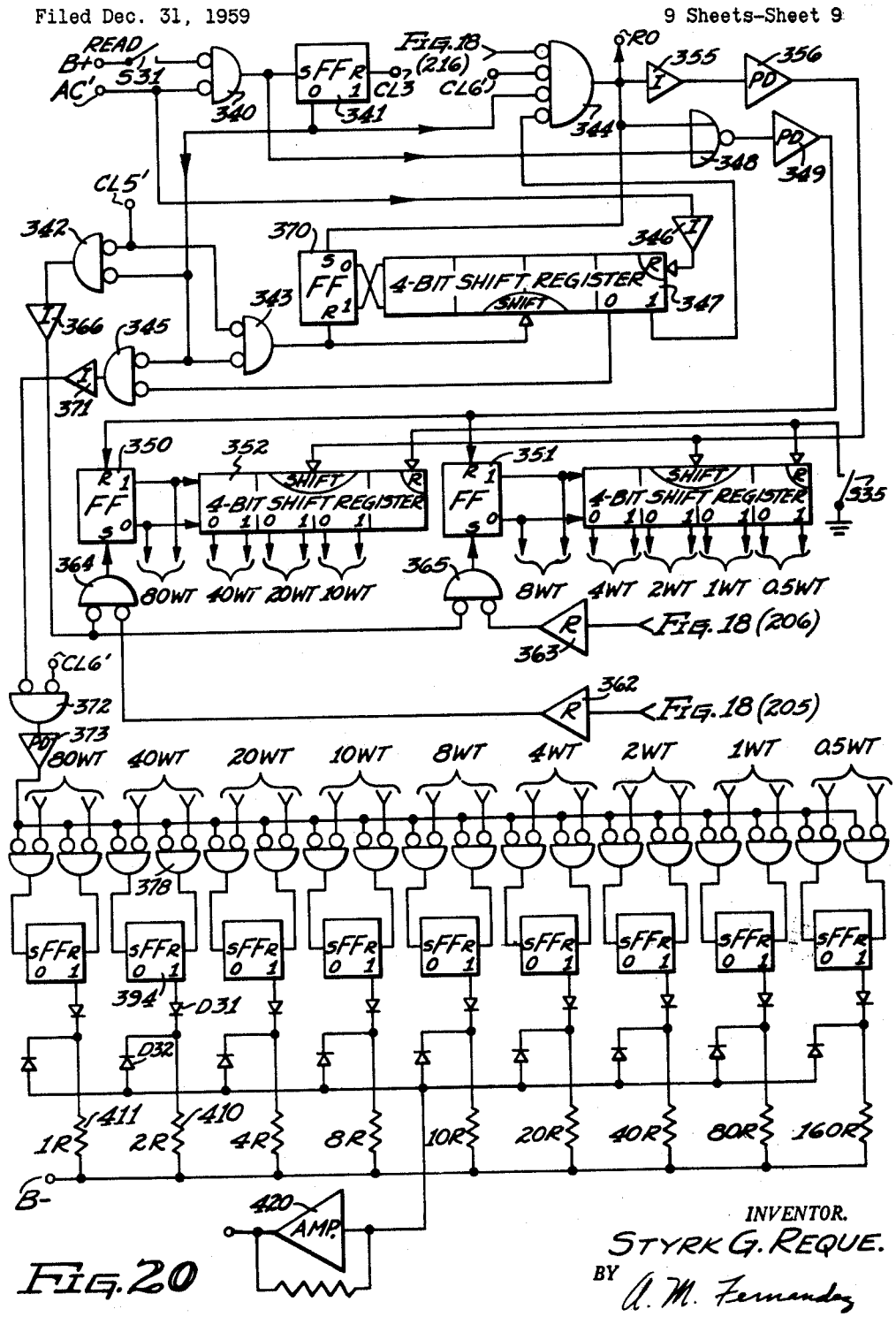

United States Patent Office 3,164,807
Patented Jan. 5, 1965

3,164,807
FUNCTION GENERATOR
Styrk G. Reque, Phoenix, Ariz., assignor to General
Electric Company, a corporation of New York
Filed Dec. 31, 1959, Ser. No. 863,196
1 Claim. (Cl. 340—172.5)

This invention pertains to systems for generating a function and more particularly to systems for generating a function from stored digital data.

In analog computers, quantities or voltages must frequently be generated as a function of time or as a function of some other quantity or voltage. The devices which have been developed to satisfy that need in analog computers are known as function generators. The large number of different function generators which have been developed reflects the variety of different application requirements which have been encountered. The function generating devices which have been developed to meet the various requirements may be divided into two general classes. The first class consists of electro-mechanical devices which are generally accurate but two slow for many applications. The second class consists of electrical devices which have good high-frequency response but generally lack the degree of accuracy often required.

The object of this invention is to provide a function generator for all types of applications having a high degree of accuracy.

Another object is to provide a function generator which can accommodate abrupt and arbitrary variations of the desired function with no additional equipment complexity.

Still another object is to provide a function generator which is free of drift and which may be held at a desired value for long periods.

A further object is to provide a function generator wherein small modifications to the stored data may be readily made without affecting the stored data pertaining to adjacent values of the function.

The objects of this invention may be realized through the provision of a memory device such as a magnetizable medium for storing in digital form the physical values of the dependent variable of a function that is to be generated. The physical values of the dependent variable are voltage amplitudes which are equal or directly proportional to the data represented by the function. Those physical values are translated into a digital form before being stored in the memory device. The address or location of a given dependent variable digitally stored in the memory device is equal or directly proportional to the corresponding independent variable which may also be expressed in a digital form. To generate the given function, the independent variable is employed to address the memory device. Each value of the dependent variable read from the memory device in digital form is transmitted to a digital-to-analog converter which translates it from its digital form to an analog or physical form. The analog value of each dependent variable is held until another dependent variable is read out. In that manner, the given function is derived from the digitally stored dependent variable.

Other objects and inventions will become apparent in the following description taken in conjunction with the accompanying drawings in which:

FIG. 2 is a schematic diagram of a circuit employed to obtain index and clock pulses;

FIG. 3 is a timing diagram of the clock pulses;

FIG. 4 illustrates in a general manner the timing of a drum index pulse with respect to clock pulses;

FIG. 7 is a circuit diagram of a modular logic element and FIGS. 7a to 7b are symbols employed to indicate the function of each logic element in the system;

FIG. 8 is a schematic diagram of a power-driver and FIG. 8a is a symbol employed to represent a power-driver;

FIG. 9 is a schematic diagram of a bistable multivibrator or flip-flop and FIG. 9a is a symbol employed to represent a flip-flop;

FIG. 10 is a schematic diagram of a binary circuit or steered flip-flop and FIG. 10a is a symbol employed to represent a binary circuit;

FIG. 11 is a circuit diagram of a one-shot circuit or monostable multivibrator and FIG. 11a is a symbol employed to represent a one-shot circuit;

FIG. 14 is a circuit diagram of a write amplifier and FIG. 14a is a symbol employed to represent a write amplifier;

FIG. 15 is a schematic diagram of a comparator circuit;

FIG. 16 illustrates a five-hole paper tape employed as an input medium;

FIG. 17 illustrates schematically a paper tape reading device;

FIG. 18 is a schematic diagram of a control circuit provided to translate information from the tape reader to a magnetic drum recording system;

FIG. 19 is a schematic diagram of addressing circuits provided to read and write information on the magnetic drum; and FIG. 20 is a schematic diagram of circuitry provided for transmitting digital information from the drum to a digital-to-analog converter.

GENERAL DESCRIPTION

Figure 1:
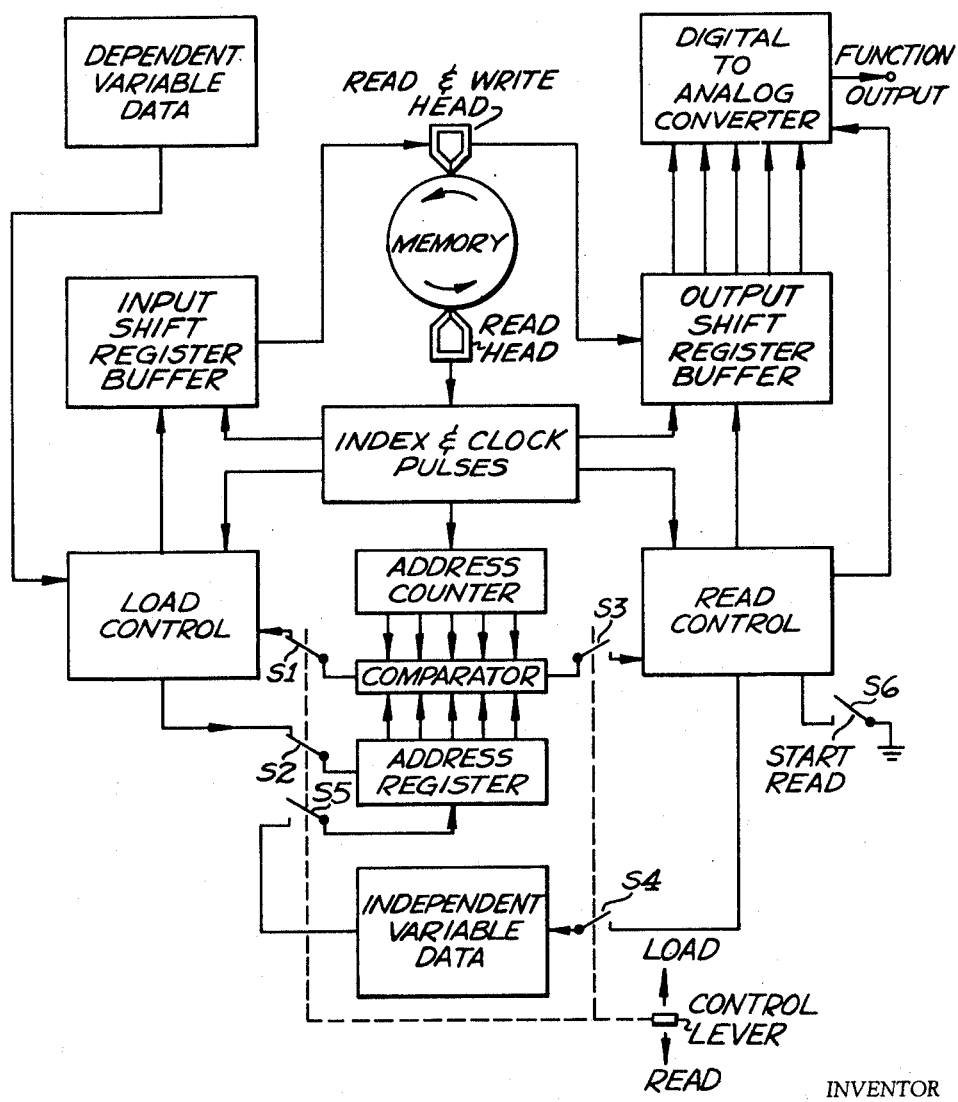
FIG. 1 is a block diagram illustrative of one form of the present invention.

The general organization of one illustrative embodiment of the present invention will be understood by reference to FIG. 1. It includes a source of the dependent variable data of a function to be generated in digital form and an input shift register which functions as a buffer for successive digital values of the dependent variable being recorded in a memory device.

The memory device is illustrated as a rotating magnetic drum but it may be any addressable digital memory device having memory locations or register sectors, each sector consisting of binary cells which may be read either sequentially or in parallel. In the present embodiment they are read sequentially by a read-and-write head. The sectors and individual cells are marked by clock pulses derived from signals permanently recorded on the drum. The sectors may be identified as the first, second, third and so on. An index pulse derived from a signal permanently recorded on the drum is employed to locate the first memory sector. Other memory sectors may then be located by counting down from the first memory sector. An address counter, address register and comparator are provided for that purpose. For instance, assume that data is to be read from the fifth sector. The binary-coded number five is entered in the address register. After an index marker pulse resets the address counter to zero, the first five clock pulses which mark the first five memory sectors are counted. When the number five is registered in the address counter, the comparator which provides instantaneous comparison of binary numbers in the counter and the register develops an output signal which enables a read-control circuit.

A load-control circuit is provided to advance the address register to the next address while recording as each successive dependent variable value is ready to be recorded on the drum. When the next memory sector is located, the binary data stored in the input shift register is recorded. In the present embodiment 300 binary-coded dependent variable values are recorded in 300 memory sectors. After the last value has been recorded, the load-control circuit is inactivated. The system is then ready to generate the desired function.

If an error has been made in recording the values of the dependent variable, or it is desired to alter any given value, the address register is preset to the address of the sector next preceding the sector wherein the value to be altered is stored and the new value is manually inserted into the channel of the source of the dependent variable. Switches not shown in FIG. 1 are then closed to activate the load-control circuit which loads the input shift register, advances the address register to the address of the next sector and causes the new value to be recorded in the desired sector.

While data is being loaded into the system, switches S1 to S6 are in the positions shown in FIG. 1. Thereafter, the switches S1 and S2 are opened and switches S3, S4 and S5 are closed in order to connect the comparator to a read-control circuit and the read-control circuit to a source of independent variable data which in turn is connected to the address register through the switch S5.

The independent variable values presented to the address register in digital form constitute the addresses of the memory sectors of the corresponding dependent variable values. Accordingly, in the present embodiment there are 300 distinct independent variable values from 1 to 300 which may address the memory.

If the analog function to be generated is a function of an independent analog voltage signal, the source of independent variable values includes an analog-to-digital converter the output of which is gated in parallel into the address register in response to signals from the read-control circuit. However, if the independent variable data is already in digital form, it is only necessary to provide a means for gating it into the address register. When the function is desired as a function of time, the source of independent variable data consists of a programmer or digital clock.

Assuming that the function is desired as a function of time, a signal from the read-control circuit starts the operation of the digital clock, but not until a start-read switch S6 is closed. When that switch is closed, the address register is preset to the address of the stored value at which the function is to begin and the digital clock starts running. As each value is read out, the address register is advanced to the address of the next succeeding sector at a rate selected by adjusting the cycle of the digital clock. After the last value in the 300th sector has been read out, the read-control circuit is inactivated.

All of the switches S1 to S5 are illustrated as being mechanically linked to a single control level to facilitate switching from the load to the read mode of operation. However, such a mechanical linkage is not necessary and the switches may be electronic.

An output shift register which is controlled by the read-control circuit is provided to staticize or convert the time sequential information from the drum into static parallel information and a digital-to-analog converter connected to the output shift register is provided to convert each digital value to a physical or analog voltage value. The digital-to-analog converter includes a bank of gated buffer flip-flops for storing each value until a new value is read out and staticized by the shift register.

A single head is shown in FIG. 1 for both reading and writing data on the information channel of the drum. However, two information channels are employed in the specific embodiment which will presently be described. Accordingly, two heads are employed, each having only one coil for reading and two coils oppositely wound for recording or writing. Similarly, only one representative read head is illustrated in FIG. 1 for the index and clock pulse channels on the drum. In the specific embodiment a plurality of heads are provided, six clock-pulse read heads and one index-pulse read head as will be more fully described.

After the dependent variable data has been recorded in the memory, it is stored indefinitely and may be read an unlimited number of times to regenerate the function. To stop the generation of the function and hold the last generated value for a period of time, it is only necessary to interrupt the source of independent variable data.

DETAILED DESCRIPTION

The following detailed description is based on a specific illustrative embodiment utilizing a magnetic drum and digital clock. However, it should be understood that the present invention is not restricted to the use of a magnetic drum as a memory device nor to a digital clock for the source of the independent variable data. As noted hereinbefore, any addressable memory device may be employed, such as a magnetic core memory, and any source of independent variable data may be provided to address the memory, such as an analog-to-digital converter.

Before describing the specific embodiment with reference to FIGS. 16 to 20, the timing of the system and the manner in which the index and clock pulses are derived will be described with reference to FIGS. 2, 3 and 4. Afterwards, but before proceeding with the specific embodiment, diagrams of circuits which may be employed to implement the basic logic of the present invention will be described. It should be understood, however, that those circuits are simply illustrative and that other conventional circuits may be used.

Index and Clock Pulse Timing

A band of tracks or channels on the memory drum is employed to store the requisite index and clock pulses. As noted hereinbefore, there are six clock pulse channels and one index pulse channel. A diagram of the circuits employed to read those channels is shown in FIG. 2. The trains of pulses derived from the six clock channels are illustrated in FIG. 3.

In the circuit of FIG. 2, there are seven coils 11 to 17. Each coil is wound around the core of a different read head (not shown) which is placed adjacent the rotating drum and positioned in lines with a corresponding one of the seven tracks in the index and clock-pulse timing band. Each one of the coils is connected to an input terminal of a different one of a plurality of read amplifiers 18 to 24 which are to be described in detail with reference to FIG. 6. Each reading amplifier produces a positive-going (0 to +6 volts) signal at its output terminal in response to a positive-going signal presented at its input terminal when a recorded pulse is sensed on the drum by its associated coil.

The positive-going signals from the read amplifiers 18 and 19 trigger respective blocking oscillators 25 and 26 which produce a pair of clock pulse trains at their respective output terminals CL1' and CL2'. Pulses produced at the output terminals CL1' and CL2' of the blocking oscillators 25 and 26 will be referred to hereinafter as CL1' and CL2' pulses, respectively. Trains of CL1' and CL2' pulses are shown in the first and second graphs of FIG. 3. It should be noted that the CL2' pulses are 180° out of phase with the CL1' pulses.

The blocking oscillators 25 and 26 are adjusted to produce pulses which are 8 microseconds wide. The time between the leading edges of two successive CL1' or CL2' pulses is 16 microseconds. These carefully timed CL1' and CL2' pulses are employed to synchronize the other clock pulses and the index pulses.

Pulses sensed by the coil 13 are gated through an inverting AND-gate 27 by CL1' pulses and translated by an inverter 28 to an output terminal CL3'. Pulses presented at that terminal are designated as CL3' and are shown in the third graph of FIG. 3. There is one CL3' pulse for every six CL1' pulses. These CL3' pulses are employed to mark the beginning of memory locations or sectors.

Pulses sensed by the coil 14 are gated through an inverting AND-gate 29 by CL2' pulses and translated by an inverter 30 to an output terminal CL4'. Pulses presented at that terminal are designated CL4' pulses. There is one CL4' pulse for each CL3' pulse the precise timing of which is illustrated by the fourth graph of FIG. 3. The CL4' pulses provide a second level of memory sector marking.

Pulses sensed by the coil 15 are gated through an inverting AND-gate 31 by CL1' pulses and translated by an inverter 32 to an output terminal CL5'. The pulses presented at that output terminal are designated as CL5' pulses. As illustrated in the fifth graph of FIG. 3, there are five CL5' pulses for each memory sector marking pulse CL3'. The CL5' pulses in each group of five pulses are employed to synchronize the read and write operations in the information channels of the magnetic drum.

Pulses sensed by the coil 16 are gated through an inverting AND-gate 33 by CL2' pulses and translated by an inverter 34 to an output terminal CL6'. The pulses presented at that output terminal are designated CL6' pulses. The CL6' pulses are presented in groups of five. The timing of the CL6' pulses with respect to the CL5' pulses is shown by the sixth graph of FIG. 3. The CL6' pulses are employed in the system to operate control circuitry associated with the read and write operations. For example, the input and output shift registers are shifted by a CL6' pulse as each bit of a given word is written or read in response to a CL5' pulse.

Pulses sensed by the coil 17 are gated through an inverting AND-gate 35 by CL1' pulses and translated by an inverter 36 to an output terminal IM'. The pulses produced at that output terminal are designated IM' pulses. Each IM' pulse is a positive-going (0 to +6 volts) pulse 8 microseconds in duration. There is only one IM' pulse stored in an index marker channel as schematically illustrated in FIG. 4 which shows in a general manner the timing of an IM' pulse with respect to the CL3' pulses during one memory cycle. There is a blank space of approximately 3.3 milliseconds on each side of the IM' pulse before the first CL3' pulse. There are, however, CL1' and CL2' pulses at regular 16 microsecond intervals throughout the complete memory cycle. The CL3' pulses indicated represent 300 CL3' pulses since 300 distinct values of dependent variable data are to be stored in the memory channels as noted hereinbefore.

The reason for designating the positive-going (0 to +6 volts) pulses with a prime, such as the CL1' pulses, is that in the system to be described a voltage level of +6 volts is used to represent a binary digit 0 and a voltage level of 0 volts is used to represent a bit 1. Accordingly, CL1' is to be read as *not* CL1 while *not* CL1', which should be written as $\overline{CL1'}$, is to be read as CL1. To avoid confusion, the double negative notation will not be used; instead its corresponding positive notation will be used. However, the complement or "not" form of a signal obtained from the false side of a set flip-flop or a one-shot circuit or from the true side of such a set circuit through an inverter will frequently be used for reasons which will become apparent as the detailed description progresses.

The sources of these index and clock pulses will not be referred to herein again. Instead, input terminals of the system which are to be connected to particular ones of the output terminals of the circuit illustrated in FIG. 2 will be indicated by the same legends, namely the legends CL1', CL2', CL3', CL4', CL5', CL6' and IM'. In that manner, the connection between input terminals of the system and output terminals of the circuit of FIG. 2 may be indicated. The relative timing of the pulses applied to the input terminals may then be readily determined by referring to FIG. 3.

In addition to the index and clock pulses just described, other synchronizing and control signals are provided in the system. They will be described as they are required together with the particular sections or circuits of the system which utilize them.

*Blocking Oscillator*

Figure 5:
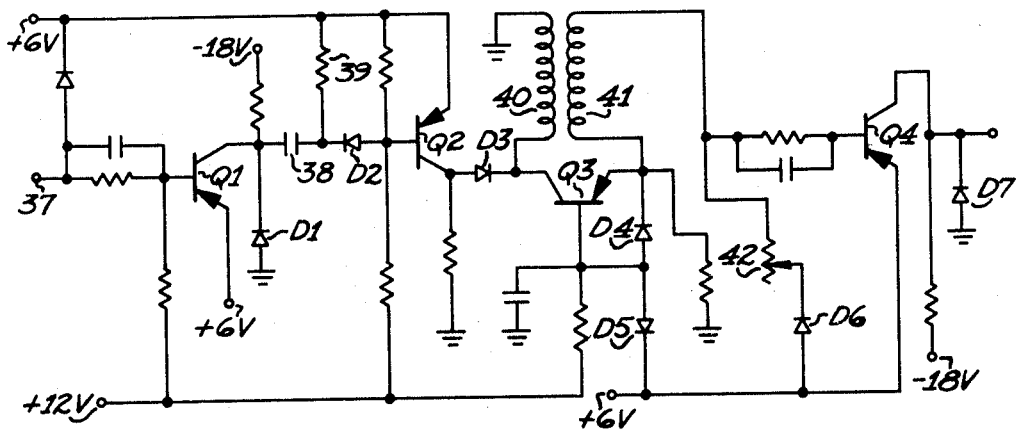
FIG. 5 is a circuit diagram of a blocking oscillator and FIG. 5a is a symbol employed to represent a blocking oscillator.
Figure 5A:

FIG. 5 is a circuit diagram of a blocking oscillator. The symbol used to represent it is shown in FIG. 5a. It includes a PNP transistor Q1 which is so biased that it conducts at saturation when its input terminal is at substantially ground or 0 volt potential. While the transistor Q1 is conducting, its collector potential is at substantially +6 volts. A positive-going (0 to +6 volts) pulse applied to an input terminal 37 drives the transistor Q1 to cutoff, thereby causing its collector potential to drop from +6 volts to substantially 0 volts due to the clamping action of a diode D1. The resulting negative-going signal from the collector electrode is differentiated by a capacitor 38 and a resistor 39 and coupled by a diode D2 to the base of a transistor Q2 which is so biased that it does not conduct except when a negative-going pulse is applied to its base electrode. When the transistor Q2 does conduct, its collector potential increases from ground to substantially +6 volts.

The +6 volt signal from the collector of transistor Q2 biases a diode D3 in a forward direction and causes current to be conducted through a primary winding 40 of a transformer. That current induces a voltage in a secondary winding 41 of the transformer which drives the emitted of a transistor Q3 positive, causes the transistor to conduct more current through the winding 40 and drives the emitter more positive. Since the loop gain of the circuit is larger than unity, regeneration takes place until the transistor Q3 is driven to saturation. Thereafter, the voltage induced in the secondary winding 41 decreases exponentially with time until the emitter becomes reverse biased and the transistor Q3 is cut off.

A diode D4 is connected between the base and emitter electrodes of the transistor Q3 to prevent the emitter from being driven negative with respect to the base electrode. While its emitter is clamped to its base by the diode D4, the transistor Q3 is insufficiently biased in a forward direction to permit it to conduct. A diode D5 is connected between the base electrode of the transistor Q3 and a source of +6 volts in order to establish a +6 volt reference potential for the base electrode.

A transistor Q4, which has its base coupled to the secondary winding 41, is normally insufficiently forward biased to conduct. Accordingly, its collector electrode is normally clamped at substantially ground potential by a diode D7. When the transistor Q3 conducts, the base of the transistor Q4 is driven toward ground potential, thereby sufficiently biasing the transistor Q4 in a forward direction to cause it to conduct at saturation. When it does conduct at saturation, its collector electrode is driven from substantially ground potential to almost +6 volts. The width of the resulting positive-going output pulse is adjusted by a potentiometer 42 to be substantially eight microseconds.

Read Amplifiers

Figure 6:
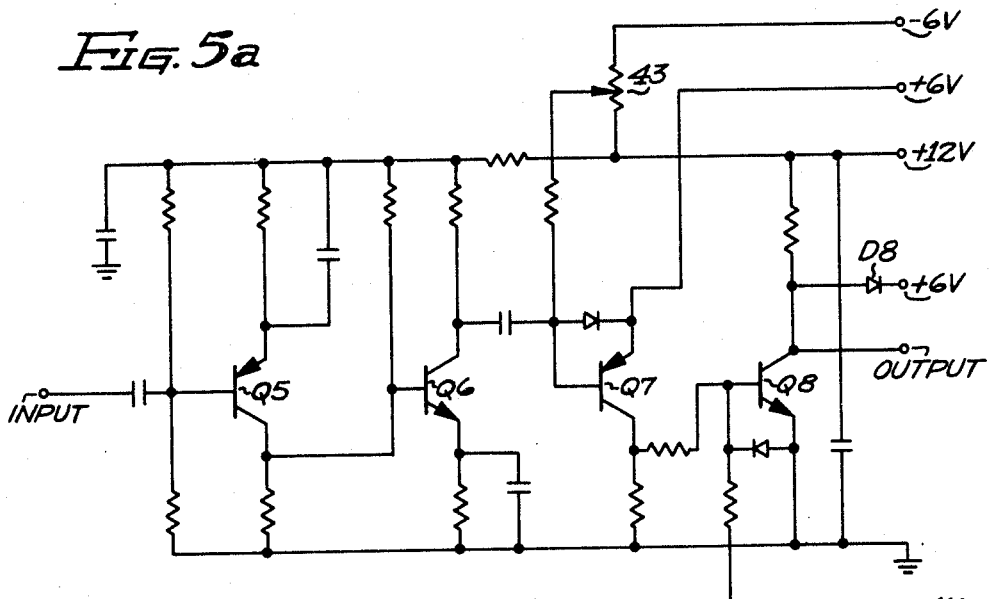
FIG. 6 is a circuit diagram of a read amplifier and FIG. 6a is a symbol employed to represent a read amplifier.
Figure 6A:
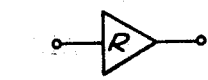

The read amplifier circuit which is illustrated in the diagram of FIG. 6 and represented by the symbol of FIG. 6a consists of four cascaded amplifier stages. The first stage includes a PNP transistor Q5 which is directly connected to the base of an NPN transistor Q6 in the second stage. The base of a PNP transistor Q7 in the third stage, which is capacitively coupled to the second stage, is so biased by a potentiometer 43 that a 0 volt output signal is obtained from the collector of an NPN transistor Q8 in the fourth stage when no signal is applied to the first stage. When a positive-going signal is applied to the first stage, the transistor Q8 is driven from a saturation to a cut-off condition after which its collector electrode is clamped at a +6 volt potential by a diode D8.

The read amplifiers in the system to be described, such as the read amplifiers 18 to 24 in FIG. 2, are each connected to a coil wound around a core of a different reading head. When the reading head scans a discrete elemental area or binary cell on the rotating magnetic drum having a bit 1 recorded therein, the magnetic flux of that cell induces a positive-going signal in the coil. Accordingly, the output terminal of a given read amplifier is normally at substantially 0 volts except when a recorded bit 1 is scanned by its associated reading head, at which times its output terminal is driven to substantially +6 volts.

Basic Circuit Module

The basic circuit module or building block from which many of the various circuits employed in the present embodiment are constructed consists of a common-emitter transistor amplifier that may also be used by itself as an AND-gate, an OR-gate or a pulse inverter.

FIG. 7 shows such a basic circuit module which will hereinafter be referred to as a logic element. It consists of a PNP junction transistor Q10 of a type suitable for general digital circuit purposes having its emitter connected directly to a source of +6 volts, its collector connected to a source of −18 volts by a load resistor 49 and its base connected to a source of +12 volts through a bias resistor 50. The collector of the transistor is clamped to ground by a germanium diode D10 so that it does not go below ground potential when the transistor is cut off. When the transistor conduits, the collector potential increases to almost +6 volts. Three input terminals 51, 52 and 53 are connected to the base. Two of the input terminals are connected through coupling resistors 55 and 56 having respective speed-up capacitors 57 and 58 connected in parallel with them. The third input terminal 53 is connected directly to the base. Depending on how the input terminals are connected and biased, the logic element functions either as an AND-gate or an OR-gate, with pulse inversion in each instance, as well as a conventional pulse inverter.

Throughout the present system each logic element will be operated with either 0 or +6 volt signals at its input terminals and with either a +6 or 0 volt output signal at its output terminal 60. The 0 volt output signal is established by conduction of current through the clamping diode D10 when the transistor is cut off and the +6 volt signal is established when the transistor conducts at saturation. Since both the diode and the transistor have some internal impedance, the output signal levels will not be at exactly 0 and +6 volts but they will nevertheless be referred to hereinafter as 0 and +6 volts for convenience. As noted hereinbefore, the +6 volt level is defined as a bit 0 and the 0 volt level is defined as a bit 1.

The logic element of FIG. 7 is used as a logic AND-gate by normally maintaining both input terminals 51 and 52 at 0 volts; the third input terminal 53 is not used in a logic AND-gate. The transistor Q10 is then normally conducting at saturation and the output terminal 60 is held at +6 volts. Both input terminals 51 and 52 must be driven to +6 volts in order to cut off the transistor and drive the potential of the output terminals to 0 volts. Thus, the output of the AND-gate is changed from a bit 0 to a bit 1 only in response to a bit 0 signal at both input terminals. If $A=1$ and $B=1$, the logic AND operation may be written as $A'B'=1$ where A' is the complement of A and is read not A and B' is the complement of A and is read not B. Accordingly, to obtain the logic AND function of any set of signals X and Y, the binary complements X' and Y' are used as the input signals.

The symbol of a logic element employed as an AND-gate is shown in FIG. 7a. It differs from the most widely used AND-gate symbol only in that a circle is shown in each input channel to indicate that the input signals are inherently inverted by the logic AND-gate and that, therefore, the binary complement of the signals to be operated upon must be provided at the input terminals to obtain an output signal which is the true AND function desired and not its complement.

As noted hereinbefore, the logic element of FIG. 7 is also used as an OR-gate and as an inverter. For the logic OR function, both input terminals 51 and 52 are normally at +6 volts to hold the transistor cut off; again the third input terminal 53 is not used. The output terminal 60 is then normally at 0 volts. If either input terminal 51 or 52 is driven to 0 volts, the transistor conducts at saturation and the potential of the output terminal is driven to +6 volts. Thus, the output of the OR-gate is changed from a bit 1 to a bit 0 in response to a bit 1 signal at either input terminal. The logic OR function may be written as $A+B=A'+B'$. Accordingly, the OR-gate operates on any set of signals A and B to provide a +6 volt output signal if either A or B is a bit 1. It should then be noted that if only one input terminal is used and the other left floating, the logic element functions simply as an inverter.

The symbols of logic elements which function as OR-gates and as inverters are shown in FIGS. 7b and 7c, respectively. The OR-gate symbol differs from the one most commonly used for the OR function only in that a circle is shown in the output channel to indicate that the circuit inherently inverts the input signals to provide the complement of the input signals. The symbol for the inverter is quite conventional.

Logic gates having more than two input terminals may be implemented by either providing additional input channels (to a maximum of four or five) similar to the input channels from the terminals 51 and 52 to the base of the transistor Q10 or by combining any number of logic elements in a single circuit having a common load resistor 49 and clamping diode D10. In other words, an AND-gate having five or more input terminals may be formed by connecting the collector electrodes of the transistors of three or more logic elements, only one of which includes the collector resistor 49 and clamping diode D10, the other logic elements being dependent upon the one resistor 49 for collector current.

A logic element which functions merely as a module to implement other digital circuits or to perform some other function is represented by the symbol shown in FIG. 7d.

Power-Driver

FIG. 8 is a circuit diagram of a power-driver. The symbol used to represent it is shown in FIG. 8a. Ia consists of an inverter 61 coupled to a power amplifier by a germanium diode D12 which passes +6 volt signals from the inverter to the base of a power transistor Q12. The inverter is also coupled to the base of transistor Q12 by two germanium diodes D13 and D14 connected in series to pass a signal that is slightly below 0 volts. As noted hereinbefore, the output potential of the inverter is slightly below 0 volts when the inverter is cut off due to the impedance of the clamping diode D10 shown in FIG. 7. An additional germanium diode may be connected in series with that clamping diode D10 to slightly increase the voltage drop between ground and the inverter output terminal in the power-driver circuit. The advantage of using two clamping diodes in series is that the turn-on response time of the power amplifier transistor Q12 may thereby be improved. The two coupling diodes D13 and D14 act as a resistor when Q12 is cut off because the slight emitter-base current that flows through them raises the base voltage, thereby insuring that the transistor Q12 is held cut off.

The emitter of the transistor Q12 is clamped to a +6 volt potential by a germanium diode D15 so that when the transistor Q12 is cut off, the output terminal 62 of the power-driver is held at a +6 volts. Since the clamping diode D15 provides a substantially constant source of +6 volts when the transistor Q12 is cut off and the transistor Q12 provides a substantially constant source of 0 volts when it conducts at saturation, as many as sixty logic elements may be driven by the output of a single power-driver.

Bistable Multivibrator

FIG. 9 shows the manner in which two logic elements 65 and 66 are cross-connected to form a bistable multivibrator or flip-flop. The symbol for a flip-flop is shown in FIG. 9a. The set 1 input terminal 69 and the bit 0 or false output terminal 70 are connected to the logic element 65 while the bit 1 or true output terminal 71 and the reset input terminal 72 are connected to the logic element 66. In operation the logic element 66 is normally conducting so that the output terminal 71 is at +6 volts. The conducting logic element 66 holds the logic element 65 cut off and the output terminal 70 is normally at 0 volts. When a bit 1 signal (0 volts) is applied to the set 1 input terminal 69, the logic element 65 is rendered conductive. When that logic element conducts, the logic element 66 is cut off in a manner typical of all Eccles-Jordan type bistable multivibrators and its output terminal 71 is at 0 volts. Thus, a bit 1 signal on the set 1 input terminal 69 produces a bit 1 output signal at the true output terminal 71. The binary complement of a bit stored in a flip-flop is always available at the false output terminal 70. Since the logic AND and OR-gates require the binary complements of the desired input signals in order to obtain the required output signals, the flip-flop output signals will generally be taken from the complementary or false output terminal 70.

Binary Circuit

FIG. 10 is a schematic diagram of a binary circuit or a steered flip-flop and FIG. 10a is a symbol which represents a binary circuit. It includes a binary input terminal 73, two output terminals 74 and 75, a set input terminal 76 and a reset input terminal 77. It consists of two logic elements 78 and 79 cross-connected to form a bistable multivibrator and a steering circuit connected to the third or direct-coupled input terminal of each logic element. The detailed description of the operation of such a steering circuit may be found at page 40, Section 15, of Handbook of Semiconductor Electronics, McGraw-Hill Book Co. (1956), edited by L. P. Hunter.

In operation the binary circuit changes its stable state in response to the leading edge of each positive-going signal at its binary input terminal 73. For instance, assume that the flip-flop is storing a bit 1, i.e., that the logic element 78 is conducting and the logic element 79 is cut off. The respective output terminals 74 and 75 are then at +6 and 0 volts. Consequently, a steering diode connected to the logic element 79 is reverse biased by almost +6 volts by the voltage of the output terminal 74 connected to the cathode of that diode through the base of the transistor in the logic element 79. The steering diode connected to the logic element 78, on the other hand, is forward biased by a few tenths of a volt. When a positive-going pulse at terminal 73 is differentiated by the coupling capacitors of the steering circuit, the resulting positive-going excursion is transmitted only by the forward-biased diode to the logic element 78. In that manner the transistor of that logic element is cut off and the stable state of the flip-flop is switched. The flip-flop of the binary circuit may also be set and reset by 0 volt signals at respective termnials 76 and 77 in a manner similar to the basic flip-flop circuit of FIG. 9.

Monostable Multivibrator

FIG. 11 is a circuit diagram of a monostable multivibrator or one-shot and FIG. 11a is a symbol for a monostable multivibrator. It has a single input terminal 80 and a pair of output terminals 81 and 82. It consists of two cross-coupled PNP junction transistors Q13 and Q14 of a type suitable for general digital circuit purposes. Each has its emitter connected to a source of +6 volts and its collector connected to a source of −18 volts through a load resistor. The base of transistor Q13 is connected to a source of +12 volts through a bias resistor 85 while the base of transistor Q14 is connected to a junction between two clamping diodes D20 and D21 by a bias resistor 86. That junction is maintained at substantially 0 volts by a Zener diode D22.

In the quiescent state, transistor Q13 is held cut off by the biasing network consisting of the bias resistor 85 and a coupling resistor 87 which connects the base of transistor Q13 to the collector of the conducting transistor Q14. In this stable condition the output terminal 81 is clamped at substantially 0 volts by the conducting diode D21 and the output terminal 82 is clamped at substantially +6 volts by the conducting transistor Q14.

When a negative-going (+6 to 0 volts) pulse is applied to the input terminal 80, it is differentiated by an RC circuit consisting of capacitor 88 and the various resistances in series with it, including a coupling resistor 89, a diode D23 and the coupling resistor 87. The differentiated negative pulse applied to the base of transistor Q13 causes it to conduct, raising the output terminal 81 to a +6 volts. That rise in voltage is immediately transmitted to the base of transistor Q14 through a commutating capacitor 90, cutting off the transistor Q14 and lowering the potential at the output terminal 82 to 0 volts. This switching action is enhanced by the positive feedback provided by the cross-coupling circuits in a manner common to all similar monostable multivibrators.

Binary Counter

Figure 12:
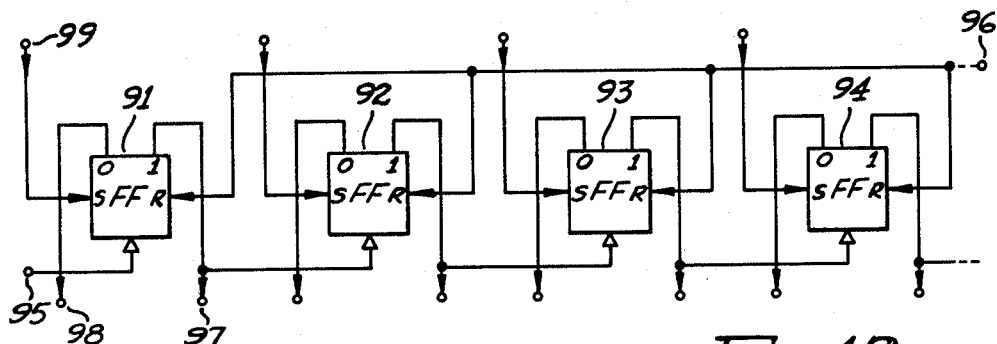
FIG. 12 is a schematic diagram of a binary counter and FIG. 12a is a symbol employed to represent a binary counter.
Figure 12A:
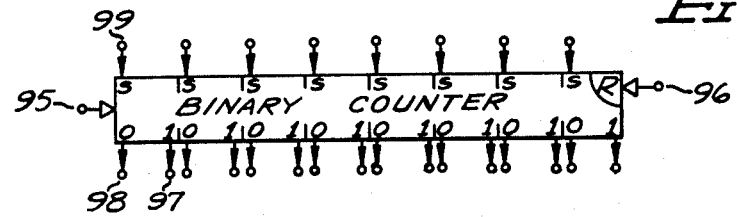

FIG. 12 is a block diagram of a binary counter and FIG. 12a is a symbol employed to represent each of three different binary counters employed in the system except that the legend is changed to reflect the function of the particular counter being represented. The counter is conventional and consists of nine cascaded binary circuits. For convenience, only the first four binary circuits 91 to 94 are shown. Positive-going (0 to +6 volts) pulses applied to an input terminal 95 are registered in a conventional manner. A 0 volt signal applied to a reset input terminal 96 will reset the counter to 0. True and false output terminals are connected to each binary circuit. For instance, a true output terminal 97 and false output terminal 98 are connected to the binary circuit 91. A preset input terminal is also provided for each binary circuit, such as the preset input terminal 99 connected to the binary circuit 91. To preset the counter, a reset pulse is first applied to the reset input terminal 96 or the counter driven by input pulses at the input terminal 95 until each stage of the binary counter is again at its 0 or reset state. After the counter is reset, selected stages are set by applying a 0 volt signal to selected input terminals.

Shift Register

Figure 13:
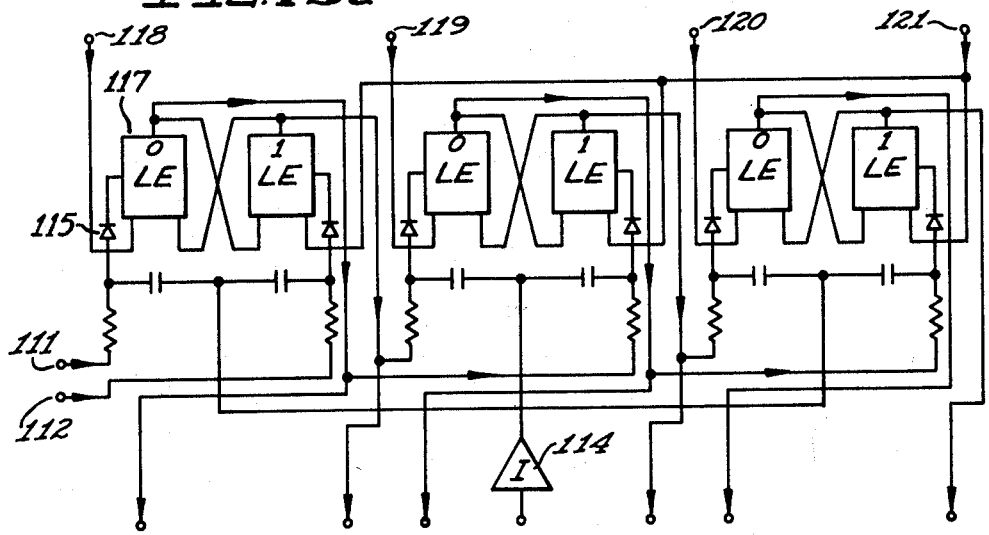
FIG. 13 is a schematic diagram of a shift register and FIG. 13a is a symbol employed to represent a shift register.

FIG. 13 is a schematic diagram of a representative shift register having three stages. Each stage consists of a bistable multivibrator as shown in FIG. 9 and a steering circuit which is the same as the one shown in the steered flip-flop or binary circuit of FIG. 10 except that the enabling potentials for the gating diodes are obtained from a preceding stage rather than from the logic elements of the associated stage. The first stage obtains the enabling potentials for its steering circuits from an external source connected to serial input terminals 111 and 112. The binary input signal that is to be shifted into the first stage is connected to the input terminal 111 and its complement is connected to the input terminal 112. Assuming that the signal to be shifted in is a bit 0 and that the first stage is storing a bit 1, a +6 volt potential is presented at the input terminal 111 and 0 volt potential is presented at the input terminal 112. A negative-going (+6 to 0 volts) pulse applied to a shift input terminal 113 is inverted by an inverter 114, differentiated and gated through a diode 115 in the steering circuit of the first stage to a logic element 117 which is thereby cut off to register a bit 0 in the first stage. Simultaneously, the shift pulse is steered to the bistable multivibrator in the second stage by the output potentials of the first stage while it is set to transfer the bit 1 initially stored in the first stage into the second. The logic and operation is the same throughout as in any other shift register except that proper attention must be given to the inverting function of each logic element in connecting them as shown.

In addition to accepting a serial input, the shift register will accept binary signals in parallel through input terminals 118, 119 and 120. However, the signals applied to the parallel input terminals should be synchronized or timed so that they are not applied while a shift operation is taking place in response to a shift pulse. In a similar manner, all stages may be reset by applying a 0 volt signal to a common reset input terminal 121.

Figure 13A:
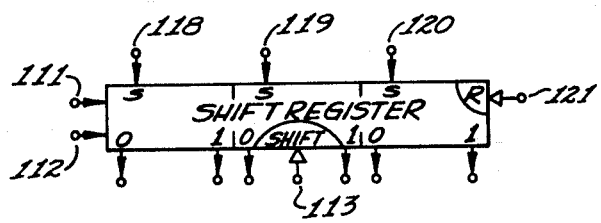

FIG. 13a is a symbol which represents a shift register having three stages such as the representative shift register in FIG. 13. In the illustrative embodiment of the present invention, shift registers having four and five stages are employed. They are similar in structure to the one illustrated in FIG. 13 except that an additional one or two stages are added. Accordingly, a symbol similar to the one illustrated in FIG. 13a will be employed to represent the four and five-bit shift registers. The legend for each shift register will indicate the exact number of stages it includes.

*Write Amplifier*

FIG. 14 is a diagram of an amplifier circuit used to record or write binary digits in cells of a rotating magnetic drum. The symbol employed to represent a write amplifier is shown in FIG. 14a. It includes a PNP transistor Q25 connected in a common-emitter amplifier configuration. Negative-going (+6 to 0 volts) signals applied to an input terminal 124 of that amplifier are inverted and coupled by a resistor 125 to the base of an NPN transistor Q26 which is normally clamped at substantially ground potential by a diode D25. When the base of the transistor Q26 is driven slightly positive with respect to ground, the transistor Q26 is switched from a state of low conduction to a state of high conduction. The emitter of the transistor Q26 is directly connected to the base of an NPN transistor Q27 so that when the base of the transistor Q26 is driven positive, the base of the transistor Q27, which is normally negative with respect to ground, is also driven to a slightly positive potential. The normally non-conducting transistor Q27 is then switched into conduction. The collector of the transistor Q27 which is normally clamped to a +12 volt potential by a diode D26 is then driven to substantially ground potential. The resulting negative-going (+12 to 0 volts) pulse is coupled by a resistor 127 to the base electrodes of a pair of PNP transistors Q28 and Q29 which are connected in parallel between a source of −18 volts and a source of +6 volts with a common collector resistor 130 but separate emitter potentiometers 131 and 132 in order to divide the power dissipated by them. The potentiometers 131 and 132 are adjusted to provide equal current flow through both transistors Q28 and Q29.

The collectors of the transistors Q28 and Q29 are normally clamped at a potential substantially −1.5 volts by a diode D27. The emitter electrode of a PNP transistor Q30 which is connected to a common-base amplifier configuration is then more negative than the base electrode which is connected to ground potential. Accordingly, transistor Q30 is normally not conducting. When the transistors Q28 and Q29 are switched into conduction by the negative-going (+12 to 0 volts) signal, the emitter electrode of the transistor Q30 is driven to a positive potential. The transistor Q30 then conducts current from a −40 volt potential source through a coil 130 which is wound around the magnetic core of a writing head not shown.

When the signal at the input terminal returns to a +6 volt potential, the transistor Q26 is returned to its normally low conducting state and the transistor Q27 is cut off. The diode D26 again clamps the collector of the transistor Q27 at almost +12 volts, a sufficiently positive potential to cut off both of the transistors Q28 and Q29, and the diode D27 is again forward biased, thereby clamping the emitter of the transistor Q30 at substantially −1.5 volts and abruptly cutting off the flow of current through the coil 130. A damping resistor 131 in series with a diode D28 shunts the coil to protect the transistor Q30 and to reduce the backswing current flow in the coil 130 after the transistor Q30 is cut off.

The write amplifier circuit just described may be employed to write only one binary digit, either a bit 1 or a bit 0, depending upon the direction in which the coil is wound around the magnetic core of the head. Assuming that the coil of the circuit in FIG. 14 is wound in a given direction for the purpose of writing a bit 1, a second amplifier circuit identical to the one illustrated in FIG. 14 is provided for writing a bit 0 through the same writing head. The only difference between the second amplifier circuit and the first one is that its coil is wound around the magnetic core of the writing head in an opposite direction.

*Comparator*

FIG. 15 is a schematic diagram of a comparator which provides a positive and instantaneous comparison of binary digits stored in two banks of flip-flops 140 and 141. Each bank consists of three flip-flops which are part of a binary counter. If the binary digits stored in one bank are identical to the corresponding binary digits stored in the second bank, a +6 volt signal is developed at an output terminal 142. For instance, if the bits stored in the first bank of flip-flops 140 are 1-0-1 and the corresponding bits stored in the second bank of flip-flops 141 are also 1-0-1, a +6 volt signal is developed at the output terminal 142. If not, the output terminal remains at a 0 volt potential.

Considering only the first flip-flop on the left of each bank and assuming that a bit 1 is stored in both of those flip-flops, the voltage signal at the false output terminal of each is at +6 volts. The +6 volt signal from the flip-flop of the bank 140 is applied directly to the input terminal of an OR-gate 143. The +6 volt signal from the flip-flop of the bank 141 is applied directly to the input terminal of an OR-gate 144 and to an input terminal of the OR-gate 143 through an inverter 145. The +6 volt signal from the first flip-flop of the bank 140 is applied to an input terminal of the OR-gate 144 through an inverter 146. Since one input terminal of each OR-gate is at a 0 volt potential, the output terminals of both OR-gates are at a +6 volt potential. Each OR-gate output terminal is connected directly to an input terminal of an AND-gate 147 which will not produce a 0 volt output signal until all of its input terminals are at a +6 volt potential.

Considering next the comparison of the second flip-flop in the bank 140 with the second flip-flop in the bank 141, if both flip-flops are in the reset state to store a bit 0, their false output terminals are both at a 0 volt potential. Accordingly, a 0 volt signal applied directly to an input terminal of an OR-gate 148 and an OR-gate 149, produces a +6 volt signal at output terminals of both OR-gates.

If the third flip-flop in the bank 140 is storing a bit which is identical to a bit stored in the third flip-flop of the bank 141, both of the OR-gates 150 and 151 associated with those flip-flops also produce a +6 volt output signal. With a +6 volt signal presented at each input terminal of the AND-gate 147, its output terminal is driven to a 0 volt potential. The signal at that output terminal is translated to the comparator output terminal 142 by an inverter 152. Accordingly, a 0 volt signal at the output of the AND-gate 147 appears as a +6 volt signal at the comparator output terminal 142, indicating that the three bits stored in the bank of flip-flops 140 are identical to the three bits stored in the bank of flip-flops 141.

If a bit stored in a flip-flop of the bank 140 is not identical with a bit stored in the corresponding flip-flop of the bank 141, the output terminal of the comparator circuit 142 remains at 0 volts. For instance, assume that a bit 1 is stored in the first flip-flop of the bank 140 and that a bit 0 is stored in the first flip-flop of the bank 141. Then both input terminals of the OR-gate 144 are at a 0 volt potential while both input terminals of the OR-gate 143 are at a +6 volt potential. Under those circumstances the OR-gate 144 produces a +6 volt signal at its output terminal but the OR-gate 143 produces a 0 volt signal at its output terminal and prevents the AND-gate 147 from producing a 0 volt output signal. Accordingly, the output terminal 142 of the inverter 152 remains at a 0 volt potential.

In the system which will now be described in detail, a binary-coded number consisting of nine bits in an address counter is compared with a binary-coded number consisting of nine bits stored in an address register. Accordingly, three comparator circuits as just described with reference to FIG. 15 will be employed, one comparator circuit for each consecutive set of three binary stages to be compared. Each of the three comparator circuits will be represented by a symbol which consists of a rectangle having six input terminals and one output terminal and bearing the legend "comparator section." The output signals of all three sections are then applied to an AND-gate to obtain an address signal.

Dependent Variable Data Source

A paper tape is employed as an input medium for inserting the dependent variable data into the memory device of the present invention. The tape is manually prepared through a conventional device similar to a typewriter having a means for punching a single binary-coded word at a time in each row.

In order to prepare the paper tape, the function which is to be generated may be first graphically plotted using the dependent variable values as the ordinates and the independent variable values as the abscissas. The axis of abscissas is then divided into 300 equal parts to obtain 300 independent variable values. The value of the dependent variable for each of the 300 dependent variables is then read and punched into the tape.

The units of the dependent variable are selected such that in the present embodiment the dependent variable values will be within the range of from 0 to 99½. Each dependent variable value is read from the graph to the nearest one-half unit. However, this is not to be construed as a limitation upon the present invention because a greater range of both dependent and independent variable values may be accommodated by providing a greater memory capacity. The tape is prepared by punching each dependent variable value in three rows. The tens digit is punched first in one row in an 8–4–2–1 binary code and the units digit is then punched in the next row, also in an 8–4–2–1 binary code. The fraction one-half is punched into a third row as a hole in the bit 1 column of the tape. In actual practice, the third word representing ½ may be punched as a binary coded 3, 5, 7, or 9, as well as 1 because it is always interpreted as a 1 by the load-control circuit since only information from the bit 1 column of the tape is used when the third word is read from the paper tape into the load-control circuit. Accordingly, if a dependent variable value does not include the fraction one-half, the third word punched into the tape for that value may be a 2, 4, 6, 8 or 0 since for any of those numbers, the bit 1 column is not punched.

If the numeral zero in the tens or units order is to be entered into the paper tape in the binary code, no holes should be punched in the 8, 4, 2, and 1 bit columns. In order to be able to distinguish the code for a numeral zero from a no-information-present code, a hole must be punched in some other column to signal the tape reader that information *is* present in that line even though no binary information column is punched. Accordingly, the zero code requires that a hole be punched in a separate zero column.

Paper Tape Organization

The organization of a typical five-column tape is illustrated in FIG. 16. Each row or line of the tape is marked by an index or guide hole. Information can not be read from a given row until the index hole is sensed. Since an index hole is smaller than the information holes but centered on the same line, the information holes will always be sensed first. This allows switches in the information sensing mechanism, such as relays or electronic switches, to settle before the information sensed is used in order to insure a positive and accurate reading of the information. The five columns are arranged as shown in FIG. 16. If a parity-check bit is to be added, another column of holes must be provided.

Preceding the dependent variable data, a START code is punched on the tape as shown. That code is a binary-coded ten. The function of the START code is to turn on the load-control circuit when the tape is to be read. If the START code is not punched, the load-control circuit will not permit information to be translated from the tape to the memory device of the system. Following the START code, the 300 dependent variable values are punched. Since each of the 300 values to be punched consists of three words 900 words must be punched on the tape. The first three coded words illustrated for the first value are seven, eight and zero. Accordingly, the first value punched after the START code is 78. The dependent variable value of 69½ for the last or 300th value is also illustrated in FIG. 16. Immediately following the last word of the 300th value is an END code which is a binary-coded twelve. That code turns off the load-control circuit.

Tape Reader

FIG. 17 illustrates schematically a mechanism for sensing punched holes in the tape which is part of a punched tape reader having a driving mechanism (not shown) capable of moving the tape past the sensing mechanism. The sensing devices in the mechanism may be either electro-mechanical or photoelectrical. There are several standard paper tape readers of both types commercially available which may be employed.

The output terminals of the sensing mechanism are identified by the legends 8, 4, 2, 1, 0, and IP in order to associate those terminals with the columns in the paper tape to which they pertain. The complement of an output signal at each of those terminals is derived through an inverter. For example, an inverter 160 is connected to the output terminal IP to provide an IP' signal. The IP signal is a tape-index pulse which, as noted hereinbefore, is to be used in the load-control circuit as a clock pulse. When a tape-index pulse is present, the IP terminal is at 0 volts. At all other times it is at +6 volts. Similarly, the punched-hole sensing mechanism is adapted to provide a 0 volt signal at the information terminals 8, 4, 2, 1 and 0 only when a hole is sensed in corresponding columns.

A switch (S11 to S16) is connected to each output terminal to provide a means for manually inserting data into the load-control circuit of the system. For instance, to insert the number seven the switches S12, S13 and S14 connected to the output terminals 4, 2, and 1 are closed and a switch S16 is closed to generate a tape-index pulse IP.

*Load Control*

The manner in which the dependent variable data is translated from the punched-hole sensing mechanism of FIG. 17 to the magnetic drum 200 in FIG. 18 by the load-control circuit will now be described. Before the operation of recording the dependent variable data on the drum is started, all of the digital control circuits of the system and the memory channels or tracks 201 and 202 on the drum 200 are manually reset. The reset state of the various bistable devices in the system will be indicated as the description progresses.

The memory channels are reset in advance by disconnecting a pair of write-bit-1 amplifiers 203 and 204 from a pair of read-and-write heads 205 and 206. In disconnecting the write-bit-1 amplifiers from the heads, it is not necessary to unwind their output coils from the cores of the heads. Each write-bit-1 amplifier may be effectively disconnected by simply disconnecting the collector electrode of the transistor Q30 (FIG. 14) from the coil 130. The write-bit-0 amplifiers 207 and 208 are then employed to write a bit 0 in each memory cell of both information channels by applying to the input terminal of each write-bit-0 amplifier a continuous 0 volt signal or a series of CL5 pulses during one complete drum revolution or memory cycle.

After the information channels have been reset and the write amplifiers have been connected as shown in FIG. 18, the tape sensing mechanism of FIG. 17 is turned on and the paper drive mechanism (not shown) is put into operation. As soon as the START code illustrated in FIG. 16 is sensed, a signal is transmitted through an AND-gate 210 and an OR-gate 211 to an input terminal of an AND-gate 212. Simultaneously, the START code is transmitted through an OR-gate 213 to an input terminal of an AND-gate 214. An IP' signal is then gated by the enabled AND-gate 214 and translated by an inverter 215 to the AND-gate 212, indicating that information is being sensed.

The sole function of the OR-gate 213 is to provide an enabling +6 volt signal to the AND-gate 214 only when information is being sensed on the tape. In that manner, an IP' signal is gated through the AND-gate 214 only when information is being sensed. The inverter 215 then provides an information-sensed signal which is transmitted through the enabled AND-gate 212 to set a flip-flop 216 and turn the load-control circuit on.

The load-control circuit remains on until the END code illustrated in FIG. 16 is sensed by the sensing mechanism of FIG. 17 and transmitted to the input terminals of an AND-gate 217 which transmits a signal through an OR-gate 218 to an input terminal of an AND-gate 219. The information-sensed signal from the inverter 215 is then gated through the AND-gate 219 to reset the flip-flop 216 and turn off the load-control circuit.

The load-control circuit may be turned on or off manually by first moving a switch S20 to the left for START or to the right for END, thereby enabling either the AND-gate 212 or the AND-gate 219, and then closing the switch S16 connected to the IP terminal together with any one of the other switches S11 to S15 in FIG. 17. Manual insertion of START and END signals is required for manually loading data in a manner to be described.

After the flip-flop 216 has been set, no further action takes place until the IP signal at an input terminal of an AND-gate 220 returns to +6 volts, except that when the false output terminal of the flip-flop 216 is driven to a +6 volt potential, a resetting signal transmitted through an OR-gate 221 and inverter 222 to a flip-flop 223 and other load-control circuit flip-flops is removed. Thereafter, when both input signals to the AND-gate 220 are at +6 volts, the flip-flop 223 is set and an AND-gate 224 is enabled.

The next line of information sensed is the tens digit of the first dependent variable value which is to be stored in the first memory sector of the drum 200. That digit is illustrated in the example of FIG. 16 as a binary-coded 7. The IP' signal gated through the AND gate 214 by the digit 7 sensed is transmitted through the enabled AND-gate 224 and an inverter 225 to a pair of AND-gates 226 and 227. The other two input signals to the AND-gate 226 are at +6 volts and a flip-flop 228 is set. Setting the flip-flop 228 enables the AND-gate 227 to transmit the gated information-sensed signal from the inverter 225 to an inverter 229 which translates it to a bank of four AND-gates 231, 232, 233 and 234. Simultaneously, the information sensed is checked by a bank of four AND-gates 235, 236, 237 and 238 to determine that the information is not a zero; that is to say, to determine that a hole has not been sensed in the zero column of the tape. The not-zero check is accomplished by inverting any signal present at a 0' input terminal by an inverter 239 and applying it to the AND-gates 235 to 238. If a hole is sensed in the zero column, the 0' input signal to the inverter 239 is at +6 volts and the inverted signal to an input terminal of each of the AND-gates 235 to 238 is at 0 volts. In that event all of the AND-gates 235 to 238 are prevented from transmitting any of the information presented at their corresponding input terminals 8', 4', 2' and 1' to the bank of AND-gates 231 to 234 through a bank of inverters 241 to 244.

Since the first digit sensed is a seven and not zero, the 4', 2' and 1' input terminals of the AND-gates 235, 236 and 237 will be at +6 volts. Accordingly, the +6 volt signal at each one of those input terminals is transmitted through an associated one of a group of inverters 341 to 344 and through a corresponding one of the AND-gates 231, 232 and 233 to set the second, third and fourth stages of a five-bit shift register 245.

At this point the flip-flop 228 is set, an AND-gate 250 is enabled and the tens digit of the first dependent variable value has been loaded into the five-bit shift register 245. When the information loaded into the shift register 245 is no longer being sensed, the IP signal applied to a terminal of the AND-gate 250 is at +6 volts and a flip-flop 251 is set. When the flip-flop 251 is set, its true output terminal is at a 0 volt potential and the AND-gate 227 to which it is connected is disabled. This prevents further information from being transferred into the five-bit shift register 245. At the same time, the false output terminal of the flip-flop 251 is at a +6 volt potential and an AND-gate 252 to which it is connected is partially enabled.

When the second digit is sensed, an information-sensed signal from the inverter 215 is transmitted through the enabled AND-gate 224. The output of the AND-gate 224 is inverted and transmitted through the enabled AND-gate 252 to set a flip-flop 253 the true output terminal of which then goes to a 0 volt potential to disable the AND-gate 226. Simultaneously, the false side of the flip-flop 253 goes to a +6 volt potential to enable an AND-gate 254 and an AND-gate 255. The information-sensed signal transmitted through the AND-gates 224 and 252 to set the flip-flop 253 is then transmitted through the AND-gate 254 and an inverter 256 to a bank of AND-gates 257 and 260. The second digit transmitted by the bank of AND-gates 235 to 238 is then gated through the AND-gates 257 to 260 and is transferred in parallel into four stages of a five-bit shift register 261.

The output pulse from the AND-gate 254 which causes the second digit of the first dependent variable value to be transferred into the five-bit shift register 261 is also transmitted as an advance-address-register signal AAR to an input terminal identified by the legend AAR in FIG. 19 to set a flip-flop 262. Setting the flip-flop 262 advances an address register 263 to the next address, i.e., from zero to the address of the first memory sector through a switch S21. After both the AAR signal and the IP signal return to a +6 volt potential, the flip-flop 261 is reset because both of those signals are applied to an AND-gate 264 the output terminal of which is connected to a reset input terminal of the flip-flop 261.

While the flip-flop 261 is being reset, a flip-flop 265 in FIG. 18 is being set in response to the positive-going (0 to +6 volts) signal at an IP input terminal of the AND-gate 255. Setting the flip-flop 265 disables the AND-gates 254 and 252 and enables an AND-gate 266. The load-control circuit is then ready to load the third part of the first dependent variable.

When the third part of the dependent variable value is sensed, an information-sensed signal is transmitted through the AND-gate 224 to enable an AND-gate 267. Upon the occurrence of the next CL5' pulse, the enabled AND-gate 266 transmits a signal through an inverter 268 and through the enabled AND-gate 267 to a set input terminal of a flip-flop 269. In that manner, the flip-flop 269 is set in time coincidence with a CL5' pulse and a +6 volt signal from the false output terminal of the set flip-flop 269 is transmitted through an enabled AND-gate 270 and an inverter 271 to enable an AND-gate 272.

While the flip-flop 269 is being set, the third part of the first dependent variable value is checked by the bank of AND-gates 235 to 238 to determine if it is a zero. Since it is a zero, a +6 volt potential is not transmitted to a second input terminal of the AND-gate 272 and a bit 1 (0 volts) signal is not presented to the first flip-flop of the five-bit shift register 261. Therefore, even if a hole had been punched in the one column of the tape, the first stage of the five-bit shift register 260 would not be set. At that point all three parts of the first dependent variable are stored in the two five-bit shift registers.

The +6 volt potential from the set flip-flop 269 which enables the AND gate 270 to transmit a signal to the AND-gate 272 and load the third part of the first dependent variable value into the five-bit shift register 260 is also transmitted to an input terminal of an AND-gate 273 and to an input terminal of a logic element 275 in FIG. 19. Hereinafter, that signal will be referred to as a register-loaded signal RL'. The logic element 275 functions as an inverter because its second input terminal is not connected to any source of potential when a switch S13 is open as shown during the loading mode of operation. The RL' signal is translated through the logic element 275 and through an OR-gate 276 to an input terminal of an AND-gate 279.

While the three digits are being loaded into the five-bit shift registers in FIG. 18, an address counter 280 in FIG. 19 is continually advanced from 0 to 300 in response to CL3' pulses and reset by IM pulses. After the address counter 280 is once again advanced to the count of one and an enabling potential is applied to an input terminal of the AND-gate 279 from the OR-gate 276, a +6 volt signal from the three comparator sections 281, 282 and 283 gates the next CL4' pulse to an inverter 284. The +6 volt signal at the output terminal of the inverter 284 will hereinafter be referred to as the address-coincidence signal AC'.

The AC' signal from FIG. 19 is transmitted through the enabled AND-gate 273 in FIG. 18 to a flip-flop 285 which is thereby set in time coincidence with the first CL4' pulse which marks the first memory sector on the drum 200. When the flip-flop 285 is set, a pair of AND-gates 286 and 287 are enabled. The AND-gate 286 transmits CL5' pulses through an inverter 288 to a blocking oscillator 289 which transmits a +6 volt enabling signal to four AND-gates 291, 292, 293 and 294 to connect the output stages of both five-bit shift registers 245 and 261 to the write amplifiers 203, 207, 204 and 208 as shown. Since the first stage of both registers is storing a bit 0 when the first CL5' pulse is transmitted through the AND-gate 286, only the write-bit-0 amplifiers 207 and 208 receive a 0 volt signal. Accordingly, a bit 0 is recorded in the first cell of the first memory sector in both memory channels 201 and 202.

The first CL6' pulse, which occurs immediately after the first CL5' pulse, is transmitted through the enabled AND-gate 287 to a shift-input terminal of both five-bit shift registers 245 and 261 thereby shifting the date stored in those shift registers one place to the right. During the shifting operation a bit 0 is shifted into the last or serial input stage of each shift register because a bit 0 is continually being presented to the serial input terminals of both shift registers as shown.

After the shift registers have been shifted one place, the five-bit shift register 245 registers a bit 1 in the first or serial output stage. The AND-gate 291 then transmits a 0 volt signal to the write-bit-1 amplifier 203 during the next CL5' period. The five-bit shift register 261, on the other hand, again registers a bit 0. Accordingly, the AND-gate 294 again transmits a 0 volt signal to the write-bit-0 amplifier 208. In that manner, a bit 1 is recorded in the second cell of the first sector of the first channel 201 and a bit 0 is recorded in the second cell of the first sector of the second channel 202. The succeeding pairs of CL5' and CL6' pulses continue to load the bits stored in the five-bit shift registers into the two memory channels of the drum. When that operation has been completed, the five-bit shift registers are in their reset state because of the bit 0 serially loaded into them in response to CL6' pulses.

The next CL3 pulse resets the flip-flop 285 and prevents succeeding CL5' and CL6' pulses from being transmitted through the respective AND-gates 286 and 287. Thus, the flip-flop 285 is set in time coincidence with the CL4' pulse and is reset in time coincidence with the next CL3 pulse. This allows only five CL5' pulses to write five binary ligits on each memory channel of the drum. It is possible for all three parts of the first dependent variable value to be written in that time because the information is written on two channels through two separate amplifiers, the tens digit in the channel 201 and the units digit and fraction in the channel 202.

The time required for the information in the five-bit shift registers to be recorded once the flip-flop 285 is set is approximately 33 milliseconds. This is nearly half the time required for the punched hole sensing mechanism in FIG. 17 to sense the first part of the next dependent variable value, i.e., the first or tens digit of the second dependent variable value to be recorded. Therefore, it is possible for the five-bit shift registers 245 and 261 to be serially cleared in time to accept in parallel succeeding dependent variable values as each successive dependent variable value is stored on the drum 200 without having to space the dependent variable values on the tape.

It should be noted that the first bit recorded in the first cell of each sector in the memory channel 201 is always a bit 0 which has no significance in the present system. That bit is recorded only to provide equal memory sector periods for both memory channels. When the data is read out from any given memory sector, the first bit from the first memory channel 201 is disregarded.

After the flip-flop 285 is reset, the entire load-control circuit is in a reset condition except for the flip-flop 216 and the flip-flop 223. The flip-flops 228, 251, 253, 265 and 269 are reset when the flip-flop 285 is set because the reset input terminals are connected to the false output terminal of the flip-flop 285 through an inverter 297, the OR-gate 221 and the inverter 222. The flip-flop 223 is also reset at that time, but when the flip-flop 285 is reset by a CL3 pulse, the resetting 0 volt potential is removed from the flip-flop 223. The AND-gate 220 then transmits a 0 volt signal to set the flip-flop 223 again when its IP input terminal again receives a +6 volt signal if the flip-flop 216 is still set.

After all of the 300 dependent variable values have been stored on the drum, the END code punched in the paper tape as illustrated in FIG. 16 is sensed by the punched-hole sensing mechanism. The AND-gate 217 in FIG. 18 receives the END code and transmits an enabling potential through the OR-gate 218 to the AND-gate 219. The IP' signal then transmitted through the AND-gate 214 and the inverter 215 is gated through the AND-gate 219 to the reset input terminal of the flip-flop 216. After the flip-flop 216 is reset, the load-control circuit is completely turned off.

The END signal transmitted to the input terminal of the flip-flop 216 is also transmitted through an OR-gate 298 in FIG. 19 to a set input terminal of a flip-flop 299. An IM pulse then resets it. The resulting positive-going pulse at the false output terminal of the flip-flop 299 is inverted by a power-driver 300 to reset the address register 263.

If an error has been made while recording a dependent variable value, or if for any reason a dependent variable value should be altered, a new value may be manually recorded in the memory sector of any given dependent variable value, as noted hereinbefore, by presetting the address register 263 to the address of the sector next preceding the given sector wherein the new value is to be recorded. To preset the address register, a switch S23 is momentarily closed to set the flip-flop 299 via an inverter 301 and the OR-gate 298. The flip-flop 299, which remains set until the next IM pulse, resets the address register 263 via the power-driver 300. The desired address is then registered by closing selected ones of a group of switches S24 which connect the output terminal of a power-driver 302 to the set input terminals of the binary circuits in the address register. Thereafter, a manual presetting switch S25 is momentarily closed to translate a 0 volt signal to the set input terminals of the address register through an OR-gate 303, the power-driver 302 and the selected ones of the group of switches S24 which are closed.

The new value is then inserted into the load-control circuit of FIG. 18 by first momentarily closing the switch S16 in FIG. 17 and closing the switch S20 in FIG. 18 to the left while the switch S16 is closed, thereby turning on the load-control circuit, and then manually keying in the three parts of the new variable by inserting each part in parallel through the switches S11 to S15 and momentarily closing the switch S16. The load-control circuit will load each part into the five-bit shift registers 245 and 261. When the second part has been loaded, the address register is advanced to the address of the next sector as described hereinbefore. After the third part has been loaded, the AND-gates 286 and 287 are enabled and the new value is recorded when the selected sector has been located. Thereafter, the load-control circuit is turned off by momentarily closing the switch S16 while the switch S20 is closed to the right.

*Read Control*

The read-control circuit will now be described with reference to FIGS. 19 and 20. That circuit controls the operation of reading and transmitting the dependent variable data from the drum memory to the digital-to-analog converter under the control of a digital clock or time-base counter as generally described with reference to FIG. 1. The address register 263, comparator sections 281 to 283, and address counter 280 in FIG. 19 are employed to address the memory channels while generating the function stored under the control of a time-base counter 304.

The read-control circuit is prepared for the operation of generating a function by closing the switch S13 and transferring the moving point of the double-throw switch S21 from the LOAD contact to a READ contact. Closing the switch S13 and transferring the moving point of the double-throw switch S21 transfers control of the address coincidence gate 279 and the address register 263 from the read-control circuit to the time-base counter. More particularly, closing the switch S13 inhibits the logic element 275 from translating a signal to the AND-gate 279 and enables an AND-gate 305 through an inverter 306. The AND-gate 305 then transmits a gating signal to the AND-gate 279 when a flip-flop 307 is set by the time-base counter 304 in a manner to be described. Moving the transfer point of the switch S21 to the READ contact enables the time-base counter 304 to periodically advance the address register from the address of one memory sector to the next. In that manner, the address register 263 is advanced from its zero condition or some other preselected condition until all of the succeeding dependent variable values have been read out from the memory channels.

The initial memory sector is selected by presetting the address register to the address of the memory sector next preceding the selected initial memory sector. For example, if the initial memory sector is to be the first, the address register is preset to zero. In order to preset the address register to zero, the manual reset switch S23 is closed as described hereinbefore. If the initial memory sector is to be some other sector, the address register is preset to the next preceding sector by closing selected ones of the group of switches S24 and momentarily closing the manual preset switch S25. For instance, if the initial memory sector is to be the ninth, the address register is preset to the address of the eighth.

The time base (or rate at which the address register is advanced) is selected by closing selected ones of a group of switches S30 to enable the time-base counter to be preset by a signal from a power-driver 308.

The time-base counter 304 is driven by IM' pulses transmitted through an enabled AND-gate 309, a ten microsecond delay element 310, an inverter 311 and an AND-gate 312 which is enabled in a manner to be described. The output of the AND-gate 312 is coupled to the input terminal of the time-base counter by an OR-gate 313. When 512 IM' pulses have been applied to the input terminal of the time-base counter, a negative-going (+6 to 0 volts) signal is applied to a one-shot circuit 314 which is thereby triggered into operation. A positive-going (0 to +6 volts) pulse produced at the output terminal of the one-shot circuit is applied through the power-driver 308 to input terminals of the time-base counter selected by closing certain ones of the group of switches S30 as described hereinbefore, thereby presetting the time-base counter to a predetermined count. Since the time-base counter recycles to zero at the count of 512, the time-base counter may be preset to operate with a time base of from 1 to 512 units of time wherein each unit corresponds to the period between two successive IM' pulses. To shorten the time base to something less than 512 units of time, such as to 100 units of time, the time-base counter is preset to the one's complement of 100.

The one's complement of the binary-coded 100 is inserted into the time-base counter through selected ones of the group of switches S30 which, when closed, connect the first, second, fourth, fifth, eighth and ninth stages (counting from the left) to the power-driver 308 such that when the one-shot 314 transmits a signal through the power-driver 308, a binary-coded 411 is inserted into the time-base counter. However, presetting the time-base counter to 411 will produce a time base of 101 IM' pulse periods because 101 IM' pulses would then be required to advance the counter to the count of 512 in order to recycle the counter, rest the ninth stage and trigger the one-shot circuit 314. It is the two's complement of 100 which should have been preset into the time-base counter to produce the time base of 100; but because the one's complement is more easily selected, the time-base counter in the preset embodiment is preset to the one's complement. The one's complement is then converted to the two's complement by adding one. That is accomplished by inserting an extra IM' pulse into the time-base counter each time it is preset to the one's complement at the beginning of each time-base counter cycle.

A complete discussion of the one's and two's complements of a number may be found in Logical Design of Digital Computers (1958) by Montgomery Phister, Jr., at pages 278 to 285. Briefly, the one's complement of a given binary-coded number may be formed by writing the complement of each bit in the number. For instance, the one's complement of the binary-coded four (0100) may be written directly as 1011, which is equal to eleven. The two's complement of 0100, however, is 1100, which is equal to twelve. Accordingly, the two's complement may be derived from the one's complement by simply adding one to the one's complement. The read-control circuit in the present embodiment provides a means for automatically adding one in order to relieve the operator of the responsibility for making the addition which may be quite burdensome when the addition of one to the least significant bit generates and transfers carries to higher orders. The manner in which an extra IM' pulse is inserted to automatically add one to the one's complement preset into the time-base counter will be explained as the description of the read-control circuit progresses.

To complete the preparation of the read-control circuit for a function generating operation, a switch S31 in FIG. 20 is closed and a switch S32 in FIG. 19 is momentarily closed to reset the time-base counter 304 to zero. The read-control circuit is then ready to commence transferring dependent variable data from the memory drum to the digital-to-analog converter in response to independent variable data from the time-base counter 304. In the following function generating operation, it is assumed that the first dependent variable value is to be read from the first memory sector and that the complete function for the independent variable values from 1 to 300 is generated.

The function generating operation is started by closing a START switch S34 to set a flip-flop 315 which remains set until the last or 300th dependent variable value has been read from the drum. The set flip-flop 315 continually enables three AND-gates 321, 322, and 323. The second input terminal of the AND-gate 321 is connected to the true output terminal of a reset flip-flop 324 through a 2.5 microsecond delay element 325. Accordingly, upon setting the flip-flop 315, the AND-gate 321 transmits a signal through an inverter 326 to an input terminal of an AND-gate 327. The first IM' pulse to occur thereafter is gated through the AND-gate 327 to set the flip-flop 324. No further IM' pulses are gated through the AND-gate 327 because when the flip-flop 324 is set, the enabling potential for the AND-gate 321 is removed and an enabling signal is no longer transmitted to the AND-gate 327 through the inverter 326. The single initial IM' pulse transmitted through the AND-gate 327 is transmitted through the OR-gate 303 and the power-driver 302 to preset the address register to the address of the memory sector next preceding the first memory sector to be read. Because it is assumed that the first memory sector to be read is the first one, all of the switches in the group S24 are open and the address register is not preset to any address but left in its zero or reset condition.

The initial IM' pulse gated through the OR-gate 303 is also translated by the enabled AND-gate 322 and an inverter 328 to the steered input terminal of a binary circuit 330 and to the steered input terminal of a binary circuit 331. Since both of those binary circuits are initially in the reset state, the initial IM' pulse sets both of them. The set flip-flop 330 then enables an AND-gate 332 to transmit an IM' pulse through a one-microsecond delay element 333 to a reset input terminal of the flip-flop 330 to reset it. The single IM' pulse gated through the AND-gate 332 is also transmitted through an OR-gate 313 to the input terminal of the time-base counter 304 to insert an initial extra IM' pulse.

The flip-flop 331 remains set as long as a +6 volt signal is applied to its reset input terminal from the false output terminal of the set flip-flop 315. Accordingly, the AND-gate 312 remains enabled until the 300 dependent variable values have been read from the drum memory. IM' pulses transmitted through the enabled AND-gate 309, delay element 310, inverter 311 and enabled AND-gate 312 are translated by the OR-gate 313 to the input terminal of the time-base counter to drive it from zero to 511 and back to zero. Normally the time-base counter is not preset for the initial counting cycle since the time required to generate the first value of the function is immaterial in most applications. However, if presetting for the first time-base counting cycle is desired, a switch S26 is momentarily closed before the START switch S34 is closed. Closing the switch S26 places a 0 volt signal on the set input terminals of stages in the time-base counter which are selected by closing certain ones of the group of switches S30 as described hereinbefore.

When the time-base counter is driven to the count of 512, a negative-going (+6 to 0 volts) carry signal is transmitted to the one-shot circuit 314 which is then triggered to produce a ten-microsecond, positive-going (+6 to 0 volts) pulse at an input terminal of the power-driver 308. The power-driver inverts that pulse and presets the time-base counter. While the false output terminal of the last stage in the time-base counter is producing a negative-going signal, the true output terminal of that stage produces a positive-going (0 to +6 volts) signal which advances the address register to the address of the next memory sector, the first one in the present instance.

After the address register 263 has been advanced to the address of the first memory sector, a CL3' pulse advances the address counter to 1 and the three comparator sections 281, 282, and 283 produce +6 volt signals which are applied to input terminals of the AND-gate 279. The positive-going pulse from the one-shot circuit 314 produced at the end of the first time-base counting cycle is also applied to a set input terminal of the flip-flop 307 through an inverter 335. Accordingly, the set flip-flop 307 enables an AND-gate 305 to transmit a signal through the OR-gate 276 to an input terminal of the AND-gate 279. Thereafter, while the comparator sections produce +6 volt signals, the CL4' pulse which follows enables the AND-gate 279 to transmit a negative-going (+6 to 0 volts) pulse. An inverter 234 receives that pulse and produces a positive-going, address-coincidence signal AC' at its output terminal which is identified by the legend AC'. That AC' signal is transmitted through an enabled AND-gate 340 in FIG. 20 to set a flip-flop 341 which enables a group of AND-gates 342, 343, 344 and 345.

When the AC' pulse is transmitted through the enabled AND-gate 340 to set the flip-flop 341, the AC' pulse is also transmitted through an inverter 346 to a reset input terminal of a four-bit shift register 347. A +6 volt signal from the true output terminal of the last stage of the reset shift register 347 is applied to an input terminal of the AND-gate 344 which is then ready to transmit CL6' pulses because its remaining control terminal connected to the start flip-flop 216 in FIG. 18 is receiving a +6 volt signal. The AC' pulse transmitted through the AND-gate 344 is transmitted through an OR-gate 348 and a power-driver 349 to the reset input terminals of a pair of buffer flip-flops 350 and 351. In that manner, an AC' pulse prepares that portion of the read-control circuit in FIG. 20 for the process of reading out the first dependent variable value by setting the flip-flop 341, resetting the shift register 347 and resetting both buffer flip-flops 350 and 351.

A pair of output shift registers 352 and 353 are connected to the buffer flip-flops 350 and 351 as shown. Both shift registers are initially reset by closing a switch S35 just as all of the flip-flops of the read-control circuit in FIGS. 19 and 20 are initially reset by a switch or switches not shown. That is to say, all of the flip-flops are reset by momentarily grounding their reset input terminals in the same manner that the shift registers 352 and 353 are reset.

When the flip-flop 341 is set and the read-control circuit of FIG. 19 is prepared in the manner just described, the first value of the dependent variable is read from the first memory sector of the pair of channels 201 and 202 illustrated on the drum 200 in FIG. 18. Coils wound around the cores of the heads 205 and 206 and connected to respective read amplifiers 362 and 363 (FIG. 19) sequentially sense the five bits stored in the respective channels 201 and 202. The output signals from the read amplifiers 362 and 363 are gated through respective AND-gates 364 and 365 into the respective buffer flip-flops 350 and 351 by CL5' pulses which are transmitted through the enabled AND-gate 342 and an inverter 366. Just as the binary digits were clocked into the first memory sector of the pair of memory channels by CL5' pulses during the loading process as described with reference to FIG. 18, the binary digits sensed are clocked out of the first memory sector into the buffer flip-flops 350 and 351 by CL5' pulses during the reading process.

Each CL5' pulse applied to the AND-gates 364 and 365 is transmitted through the enabled AND-gate 343 to the reset input terminal of a buffer flip-flop 370 and to a shift input terminal of the shift register 347. The first CL5' pulse will not affect the flip-flop 370 which is already reset nor the shift register 347 since there is not a bit 1 to be shifted present. However, before the second CL5' pulse is applied, a CL6' pulse is transmitted through the enabled AND-gate 344 to a set input terminal of the flip-flop 370. Accordingly, the second CL5' pulse shifts the set condition of the flip-flop 370 into the first stage of the shift register 347 and resets the flip-flop 370. The same sequence of events occurs in response to the second CL6' pulse and the third CL5' pulses and again in response to the third CL6' pulse and the fourth CL5' pulse. The fourth CL6' pulse sets the flip-flop 370 again for the last time until another AC' pulse initiates another reading cycle. The fifth CL5' pulse again resets the flip-flop 370 and shifts the set condition of the stages in the shift register one place to the right, thereby setting the output or last stage. The signal at the true output terminal of that stage is then 0 volts. Accordingly, the AND gate 344 is then disabled and the fifth CL6' pulse is not transmitted to the set input terminal of the flip-flop 370.

The +6 volt signal at the false output terminal of the shift register 347 then enables the AND-gate 345. By that time, the first four bits from each of the two parallel memory channels have been shifted into the output shift registers 352 and 353 and the fifth bits from the two channels are stored in the flip-flops 350 and 351. The enabled AND-gate 345 transmits a signal through an inverter 371 to an AND-gate 372 to enable it to transmit the next or fifth CL6' pulse to a power-driver 373 which opens a bank of AND-gates, such as an AND-gate 378, in order to transfer the data in the buffer flip-flops 350 and 351 and the shift registers 352 and 353 into a bank of output buffer flip-flops, such as the flip-flop 394. It should be noted that the last stage on the right of the shift register 352 does not have its output signals gated to a flip-flop because the bit 0 read into that stage is the first extraneous bit recorded in the memory channel 201, as explained hereinbefore. The bank of gated output buffer flip-flops store each dependent variable value read from the drum memory until a succeeding value is read. In that manner, the output buffer flip-flops present the dependent variable values to the digital-to-analog converter.

The first CL6' pulse transmitted through the AND gate 344 produces a read-out (0 volts) signal RO at a terminal identified by the legend RO. That signal is applied to a reset input terminal of the flip-flop 307 in FIG. 19. When that flip-flop is reset, the AND-gate 279 is disabled until the time-base counter sets it again.

The first CL3 pulse to occur after the fifth CL6' pulse to be transmitted through the AND-gate 344 in FIG. 20 resets the flip-flop 341 and disables the portion of the read-control circuit in FIG. 20. Accordingly, no further action takes place in that portion until another AC' pulse is received at an input terminal of the AND-gate 340.

The second and succeeding dependent variable values are read under the control of the time-base counter in the same manner as the first. The second and succeeding carry signals from the time-base counter occur exactly 100 IM' pulse periods apart when the group of switches S30 are set to preset the time-base counter to the one's complement of 100. Each carry signal advances the address counter by one address. As the address register is advanced through all of the addresses from 1 to 300, the comparator sections 281, 282 and 283 enable the AND-gate 279 to transmit AC' pulses to the flip-flop 341 in FIG. 20. Each time the flip-flop 341 is set, another binary-coded dependent variable value is read and transferred to the bank of output buffers.

After the 300th dependent variable has been read, the time-base counter goes through another cycle and advances the address register to the 301st address. An AND-gate detects the presence of the 301st address and immediately transmits a signal through the OR-gate 298 to set the flip-flop 299 which in turn resets the address register 263 through the power-driver 300 and resets the flip-flops 315 and 324 through an inverter 407. Resetting the flip-flop 315 turns the read-control circuit off.

If for some reason it is necessary or desirable to interrupt the generation of the function without turning off the read-control circuit and without losing the last value of the function generated, a hold switch S40 may be closed. While the switch S40 is closed, the AND-gate 309 is disabled and the transmission of IM' pulses to the time-base counter is interrupted. Thereafter, when the switch S40 is opened again, the time-base counter resumes its operation. Meanwhile the last value read is held by the bank of output buffer flip-flops.

*Digital-to-Analog Converter*

The digital-to-analog converter is connected to the bank of output buffer flip-flops as shown in the bottom half of FIG. 20. Since each bit stored in the buffer flip-flops is weighted in accordance with the binary code, as indicated by legends at the input terminals of the bank of coupling AND-gates, the data stored in the buffer flip-flops is converted to an analog form by converting each bit 1 stored into some physical action, the action in each instance being proportional to the weight assigned to the bit 1 in the binary code, and adding all of the actions. The action in the present embodiment is the flow of current. Accordingly, the converter consists of a current generator for each bit of the binary-coded data stored in the buffer flip-flops and a current-summing network.

Each current generator consists of a pair of switching diodes and a weighted resistor connected to a source of potential. For instance, the current generator connected to the flip-flop 394 comprises a pair of diodes D31 and D32 and a resistor 410 which has a resistance value four times the resistance value of a standard resistor 411 located in the current generator for the binary digit having the greatest weight assigned to it so that the current through the resistor 410 is four times greater than the current through the resistor 411 in accordance with Ohm's law when the diodes D31 and D32 switch current through it to an operational amplifier 420. The value of resistance assigned to each of the resistors in the remaining current generators is inversely proportional to the weight assigned to the binary digit with which it is associated, considering the resistor 411 in the current generator associated with the most significant bit of the tens digit as the standard.

If a bit 1 is stored in the flip-flop 394, the potential of its true output terminal is at a −6 volt potential. That potential is provided by clamping the true output terminal to a −6 volt potential through a diode when the flip-flop is set, instead of to a 0 volt potential as described with reference to FIGS. 7 and 8. In that manner, a −6 volt potential is applied to the anode of the diode D31 to bias it in reverse. The diode D32 having its anode connected to an input terminal of the operational amplifier 420 which is maintained at substantially a 0 volt potential then conducts current from that input terminal to a source of negative potential B− through the resistor 410.

If a bit 0 is stored in the flip-flop 394, the true output terminal is at +6 volts and the diode D31 conducts thereby clamping the cathode of the diode D32 at substantially +6 volts. Because the input terminal of the operational amplifier always remains at substantially 0 volt potential, the diode D32 becomes reverse biased and does not conduct current from the input terminal of the operation amplifier.

The operational amplifier is a summing amplifier consisting of any suitable direct-coupled amplifier including a negative feedback resistor connecting its output terminal to its input terminal. The operation of summing amplifiers and their design considerations are discussed in standard reference books such as Electronic Analog Computers (1952) by G. A. Korn and T. M. Korn. Briefly, the summing amplifier provides a voltage signal at its output terminal which is directly proportional to the sum of all of the currents at its input terminal. In that manner, each value of the function generated is presented as an analog voltage signal.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claim is therefore intended to cover and embrace any such modifications, within the limits only of the true spirit and scope of the invention.

What is claimed is:

A system for generating a voltage signal as a function of time comprising: a first storage means having a plurality of memory locations designated by successive addresses expressed as a sequence of numbers, each number representing a value of time as the independent variable of said function, each location storing a group of digital signals representing a corresponding dependent variable; a source of pulses recurring at predetermined intervals; a digital counter coupled to said source of pulses for counting said pulses and for producing an output signal each time a predetermined number of pulses are counted; a second storage means for storing a group of digital signals representing a given independent variable value; means coupled to said second storage means and to said digital counter for incrementing said given independent variable value stored in said second storage means in response to each output signal from said digital counter, thereby causing said group of digital signals stored in said second storage means to represent successively greater independent variable values with the passage of time; addressing means coupled to said first and second storage means for locating a memory location designated by an address expressed as a numerical value equal to said independent variable value stored in said second storage means; a third storage means for storing a group of digital signals; translating means coupled to said first and third storage means for translating a group of digital signals from a memory location to said third storage means; read-control means coupled to said addressing means and said translating means for causing said translating means to translate a group of digital signals from a memory location in said first storage means to said third storage means when said addressing means locates a memory location designated by said group of digital signals stored in said second storage means; and converting means coupled to said third storage means for converting a group of digital signals stored therein to an analog voltage signal whereby a voltage signal is generated as a function of time.

References Cited by the Examiner
UNITED STATES PATENTS

| | | | |
|---|---|---|---|
| 2,540,654 | 2/51 | Cohen | 340—172.5 |
| 2,865,564 | 12/58 | Kaiser et al. | 235—61 |
| 2,866,506 | 12/58 | Hierath | 340—172.5 |
| 2,918,656 | 12/59 | Nolde | 340—173 |
| 2,922,990 | 1/60 | Anderson | 340—172.5 |
| 2,946,044 | 7/60 | Bolgiano et al. | 340—347 |
| 2,987,704 | 6/61 | Gimpel et al. | 340—172.5 |
| 3,018,045 | 1/62 | Poland | 235—154 |
| 3,102,258 | 8/63 | Curry | 340—347 |

MALCOLM A. MORRISON, *Primary Examiner.*

EVERETT R. REYNOLDS, IRVING L. SRAGOW,
*Examiners.*